US012641020B2

(12) United States Patent
    Tamizkar

(10) Patent No.:     US 12,641,020 B2
(45) Date of Patent:         May 26, 2026

(54) METHOD FOR FACILITATING CONVEYING OF A DATA FRAME IN A COMMUNICATIONS NETWORK

(71) Applicant: Telia Company AB, Solna (SE)

(72) Inventor: Babak Tamizkar, Stockholm (SE)

(73) Assignee: Telia Company AB (SE)

( * ) Notice: Subject to any disclaimer, the term of this patent is extended or adjusted under 35 U.S.C. 154(b) by 86 days.

(21) Appl. No.: 18/883,740

(22) Filed: Sep. 12, 2024

(65) Prior Publication Data

US 2025/0088460 A1      Mar. 13, 2025

Related U.S. Application Data

(60) Provisional application No. 63/537,872, filed on Sep. 12, 2023.

(51) Int. Cl.
| | |
|---|---|
| *H04L 45/00* | (2022.01) |
| *H04L 12/46* | (2006.01) |
| *H04L 45/745* | (2022.01) |
| *H04L 49/00* | (2022.01) |
| *H04L 61/103* | (2022.01) |

(52) U.S. Cl.
    CPC .......... *H04L 45/66* (2013.01); *H04L 12/4645* (2013.01); *H04L 45/745* (2013.01); *H04L 49/70* (2013.01); *H04L 61/103* (2013.01)

(58) Field of Classification Search
    CPC .......... G06F 2009/45595; G06F 9/455; G06F 9/45558; H04L 12/4633; H04L 12/4641; H04L 12/4645; H04L 2101/622; H04L 45/02; H04L 45/04; H04L 45/586; H04L 45/66; H04L 45/74; H04L 45/745; H04L 49/354; H04L 49/70; H04L 61/103; H04W 36/0019; H04W 40/02; H04W 40/246; H04W 40/248; H04W 40/36; H04W 8/26; H04W 88/16
    See application file for complete search history.

(56) References Cited

U.S. PATENT DOCUMENTS

| | | | |
|---|---|---|---|
| 10,057,162 B1 * | 8/2018 | Singh | .................... H04L 61/103 |
| 2011/0075667 A1 * | 3/2011 | Li | ........................... H04L 45/04 |
| | | | 370/392 |

(Continued)

FOREIGN PATENT DOCUMENTS

| | | | |
|---|---|---|---|
| CN | 1561046 A | * | 1/2005 |

OTHER PUBLICATIONS

Machine translation of CN 1561046. (Year: 2004).*

(Continued)

*Primary Examiner* — Christopher Biagini
(74) *Attorney, Agent, or Firm* — Burr & Forman LLP; Nathaniel T. Quirk, Esq.

(57)                    ABSTRACT

One or more methods in a network topology comprising a plurality of routers and a plurality of nodes, where the routers include at least a first router, a second router and at least one transit router, wherein the method(s) permit for at least one, or some or each, of the router(s) (e.g., the transit router(s)) to determine to which entity in the network(s) to forward the data frame based on (e.g., only) the so-called layer-two part of the frame, possibly without the need to read the so-called layer three part of the data frame.

19 Claims, 5 Drawing Sheets

(56) References Cited

U.S. PATENT DOCUMENTS

| 2013/0159409 | A1* | 6/2013 | Kelkar | H04L 61/59 |
| | | | | 709/204 |
| 2014/0023074 | A1* | 1/2014 | Mishra | H04L 45/66 |
| | | | | 370/390 |
| 2014/0140244 | A1* | 5/2014 | Kapadia | H04L 61/103 |
| | | | | 370/255 |
| 2015/0222543 | A1 | 8/2015 | Song et al. | |

OTHER PUBLICATIONS

European Patent Application No. EP 24 19 9744, European Search Report Dated Jan. 13, 2025, European Intellectual Property Office.

* cited by examiner

METHOD FOR FACILITATING CONVEYING OF A DATA FRAME IN A COMMUNICATIONS NETWORK

CROSS-REFERENCE TO RELATED APPLICATION

The present application claims priority to U.S. Provisional Patent Application No. 63/537,872, filed on Sep. 12, 2023, the contents of which are hereby incorporated by reference in their entirety.

TECHNICAL FIELD

The present invention generally relates to communications. More specifically, the present invention relates to methods and communications networks for facilitating conveying, or routing, of at least one frame, e.g., a data frame, (or more generally, traffic) in a network topology comprising a plurality of routers and a plurality of nodes.

BACKGROUND

Communication networks in, e.g., the Internet are generally connected to each other via routers. Routers are used to convey traffic (e.g., data, such as data frames) from between a first node in a first network or subnet to a second node in a second network or subnet. The first node may be referred to as a source node. The second node may be referred to as a destination node. The first network or subnet may be the same as or different from the second network or subnet. In general, routers employ routing protocols to ensure that data is conveyed from a source node to an intended destination node. Each router in a network may maintain as so-called a routing table, which may include information regarding (e.g., all) available routes from a source node to one or more destination nodes within the network(s). A router may execute routing protocols in the router to dynamically update the routing table of the router, and to discover information about the network topology of the network entities around (e.g., closest to) the router. Generally, routing protocols are mechanisms by which routing information is exchanged between routers so that routing decisions can be made by the routers. Different routing protocols exist. Each instance of the routing protocol on each router may cause communication with the other routers to determine how many routers are available and how they are connected to each other. Routers may advertise their directly connected subnets as well as received subnets from other routers to their neighboring routers. Each router may determine the best path between the router and all other routers (subnets). This may result in that it is known at each router which subnets exist in the network and what the best path is to reach other subnets. For each router, this and other information may be included in a routing table that is maintained at the router.

If a data frame is to be conveyed between two nodes (which two nodes hence may be referred to as a source node and a destination node), the data from the source node may pass by one or more routers to reach the destination node. When the router receives data frame from the source node, the router may determine the source Internet Protocol (IP) address and the destination IP address indicated in the data frame. The router may then use its routing table to find the best path in the network(s) to convey the data frame towards the destination node. During conveyance of the data frame in the network(s), any other routers may execute the same or similar routing decisions to determine to which entity in the network(s) to forward the data frame until the data frame reaches the destination node.

SUMMARY

During conveyance of a data frame between the source node and the destination node, in order for the router(s) to determine to which entity in the network(s) to forward the data frame, each router may need to read the contents of the data frame up to the so-called layer-three part (IP addresses included in the data frame, e.g., the source IP address and destination IP address, which may be referred to as the L3 part). Thus, each router may need to read the so-called layer-two part (Medium Access Control (MAC) addresses, which may be referred to as the L2 part) as well as the layer-three part of the data frame to determine to which entity in the network(s) to forward the data frame. This process may be relatively time-consuming for the router and may further require a relatively large portion of the computational resources of the router.

In view of the above, a concern of the present invention is to provide method for facilitating conveying, or routing, of at least one data frame (or more generally, traffic) in a network topology comprising a plurality of routers and a plurality of nodes, which method facilitates or enables increasing the data frame forwarding speed of the routers in the network topology.

To address at least one of this concern and other concerns, methods and communication networks in accordance with the independent claims are provided. Preferred embodiments are defined by the dependent claims.

Conceptually, one or more embodiments of the present invention facilitate or enable increasing the data frame forwarding speed of the routers in a network topology comprising a plurality of routers and a plurality of nodes, where the routers include at least a first router, a second router and at least one transit router, by allowing for at least one, or some, or each, of the router(s) (e.g., the transit router(s)) to determine to which entity in the network(s) to forward the data frame based on (e.g., only) the layer two part of the frame. In particular, by means of one or more embodiments of the present invention, at least one, or some, or each, of the router(s) may determine to which entity in the network(s) to forward the data frame without the need to read the layer three part of the data frame. Thereby, the process of the router(s) to determine to which entity in the network(s) to forward the data frame may be less time-consuming for the router(s), which may result in an increase of the data frame forwarding speed of the router(s). Further, less computational resources of the router(s) may be needed for the router(s) to determine to which entity in the network(s) to forward the data frame, which may result in an improvement of the performance of the routers in the network topology.

One or more embodiments of the present invention may conceptually be referred to herein as MAC-IP Routing (MIPR) without any loss of generality.

MIPR may facilitate or allow for node floating, in the sense that each or any of the nodes may be able to move from its (e.g., physical) location and connect anywhere else in the network without changing its IP address.

MIPR may support virtual routing and forwarding (VRF) technology without the need for additional complex routing protocols such as IS-IS, MBGP, and MPLS running on the network.

In accordance with principles of one or more embodiments of the present invention, when or whenever a router receives a frame from a first node (cf. description below of terminology which may be used herein for facilitating understanding of the illustrated embodiments), it may replace the source MAC address of the frame with a customized MAC address, which may be referred to herein as MIPR MAC address or simply as MIPR MAC. This MIPR MAC may include an identifier (ID) of the router, the VRF number of the ingress port, and the source IP address field of the frame. The first router may then look up the ID of the second router, to which the frame is to be sent, from the destination MAC address field of the frame and may send out the frame towards the second router through the gateway port in its routing table. The next router, which could be a transit router, may then only look at the destination MAC address field of the frame in order to send out the frame towards the second router through the gateway port in its routing table. The second router may then receive the frame. The second router may replace the frame's MIPR destination MAC address field with the original MAC address of the second node by using its address resolution protocol (ARP) table and sending out the frame on the port where the second node is connected.

According to a first aspect of the present invention, a method in a communications network, comprising a plurality of nodes including at least a first node and a second node connected via a plurality of routers including at least a first router, a second router and at least one transit router, is provided. The method is for facilitating conveying of at least one data frame from the first node to the second node via at least some of the plurality of routers. The first router is directly connected to the first node and the second router is directly connected to the second node, and the at least one transit router is connected between the first router and the second router. Each router has at least two interfaces configured to receive and transmit frames, and each router is configured to maintain at least one instance of a routing table indicating available routes in the communications network between the router and the plurality of nodes. Each router has a unique identifier (ID), and a unique IP address, and each interface of the router has a routing instance (RI) identifier indicating which instance(s) of routing table is or are permitted to be used for forwarding frames via the interface. The RI identifier may be, e.g., a VRF number. Each of the first node and the second node has an IP address and a unique MAC address, wherein each of any subnet of the communications network has a default gateway and each default gateway has an IP address, and wherein at each router, every subnet hosted by the router (e.g., all subnets which are available to the router) via any interface(s) of the router which are interfacing node(s) and the respective default gateway(s) of the subnet(s) are defined, or known.

The method according to the first aspect of the present invention comprises the first node generating a first address resolution protocol (ARP) frame and sending the first ARP frame to the first router. The first ARP frame includes at least: a source MAC address and a sender MAC address each of which corresponds to the MAC address of the first node, a sender IP address corresponding to the IP address of the first node, and a target IP address corresponding to the IP address of the second node. The first router receives the first ARP frame from the first node and subsequently replaces each of the source MAC address and the sender MAC address of the first ARP frame with: the ID of the first router, the RI identifier of the interface via which the first router received the first ARP frame, and an IP address corresponding to the sender IP address of the first ARP frame. The first router, based on the first router's routing table, determines that the second router hosts a subnet which the target IP address of the first ARP frame is part of and the ID of the second router, and subsequently sets a destination MAC address of the first ARP frame to include: the ID of the second router, the IP address of the default gateway of the said subnet, and a RI identifier indicating that any instance of routing table is permitted to be used for forwarding frames via the default gateway. The first router determines an interface of the first router via which to forward the first ARP frame based on the first router's routing table and the ID of the second router in the destination MAC address of the first ARP frame, and forwards the first ARP frame via the determined interface. At least one of the transit router(s) receives the first ARP frame, determines an interface of the transit router via which to forward the first ARP frame based on the transit router's routing table and the ID of the second router in the destination MAC address of the first ARP frame, and forwards the first ARP frame via the determined interface. The second router receives the first ARP frame, and, upon determining that the second router's ID is included in the destination MAC address of the first ARP frame, sends the first ARP frame via each interface of the second router that is directly connected to a node and for which the RI identifier matches the RI identifier of the source MAC address of the first ARP frame. The second node receives the first ARP frame, and, upon determining that the target IP address in the first ARP frame matches the IP address of the second node, determines that the first ARP frame is intended for receipt by the second node.

According to a second aspect of the present invention, a communications network is provided. The communications network comprises a plurality of routers, including at least a first router, a second router and at least one transit router. The communications network comprises a plurality of nodes, including at least a first node and a second node connected via the plurality of routers. The first router is directly connected to the first node and the second router is directly connected to the second node, and the at least one transit router is connected between the first router and the second router. Each router has at least two interfaces configured to receive and transmit frames. Each router is configured to maintain at least one instance of a routing table indicating available routes in the communications network between the router and the plurality of nodes, wherein each router has a unique ID and a unique IP address, and each interface of the router has an RI identifier indicating which instance(s) of routing table is or are permitted to be used for forwarding frames via the interface. The RI identifier may be, e.g., a VRF number. Each of the first node and the second node has an IP address and a unique MAC address, wherein each of any subnet of the communications network has a default gateway and each default gateway has an IP address. At each router, every subnet hosted by the router via any interface(s) of the router which are interfacing node(s) and the respective default gateway(s) of the subnet(s) are defined. The first node includes a processor and a transmit/receive unit configured to generate a first ARP frame and send the first ARP frame to the first router. The first ARP frame includes at least: a source MAC address and a sender MAC address each of which corresponds to the MAC address of the first node, a sender IP address corresponding to the IP address of the first node, and a target IP address corresponding to the IP address of the second node. The first router includes a processor and a transmit/receive unit configured to receive the first ARP frame from the first node and subsequently replace each of the source MAC address and the sender MAC address of the first ARP frame with: the ID of the first router, the RI identifier of the interface via which the first router received the first ARP frame, and an IP address corresponding to the sender IP address of the first ARP frame. The processor and the transmit/receive unit of the first router are further configured to, based on the first router's routing table, determine that the second router hosts a subnet which the target IP address of the first ARP frame is part of and the ID of the second router, and subsequently set a destination MAC address of the first ARP frame to include: the ID of the second router, the IP address of the default gateway of the said subnet, and a RI identifier indicating that any instance of routing table is permitted to be used for forwarding frames via the default gateway. The processor and the transmit/receive unit of the first router are further configured to determine an interface of the first router via which to forward the first ARP frame based on the first router's routing table and the ID of the second router in the destination MAC address of the first ARP frame, and forward the first ARP frame via the determined interface. At least one of the transit router(s) includes a processor and a transmit/receive unit configured to receive the first ARP frame, determine an interface of the transit router via which to forward the first ARP frame based on the transit router's routing table and the ID of the second router in the destination MAC address of the first ARP frame, and forward the first ARP frame via the determined interface. The second router includes a processor and a transmit/receive unit configured to receive the first ARP frame, and, upon determination that the second router's ID is included in the destination MAC address of the first ARP frame, send the first ARP frame via each interface of the second router that is directly connected to a node and for which the RI identifier matches the RI identifier of the source MAC address of the first ARP frame. The second node includes a processor and a transmit/receive unit configured to receive the first ARP frame, and, upon determination that the target IP address in the first ARP frame matches the IP address of the second node, determine that the first ARP frame is intended for receipt by the second node.

As mentioned, at least one of the transit router(s) may receive the first ARP frame and determine an interface of the transit router via which to forward the first ARP frame based on the transit router's routing table and the ID of the second router in the destination MAC address of the first ARP frame. Thus, the at least one of the transit router(s) may determine the interface of the transit router(s) via which to forward the first ARP frame without the need to read the layer three part of the first ARP frame. Thereby, the process of determining to which entity to forward the frame (e.g., the first ARP frame) may be less time-consuming, which may result in an increase of the frame forwarding speed of the transit router(s). Further, less computational resources of the transit router(s) may be needed for the transit router(s) to determine to which entity to forward the frame, which may result in an improvement of the performance of the transit routers in the network topology. Accordingly, according to one or more embodiments of the present invention, the at least one of transit router(s) receiving the first ARP frame may determine the interface of the transit router via which to forward the first ARP frame only based on the transit router's routing table and the ID of the second router in the destination MAC address of the first ARP frame.

Each router may further be configured to maintain an ARP table indicating at least any identified association between IP addresses of respective ones of the plurality of routers and the plurality of nodes with their corresponding MAC addresses. Subsequent to the first router receiving the first ARP frame from the first node and prior to the replacing of the source MAC address and the sender MAC address of the first ARP frame, the first router may update its ARP table by associating the source MAC address of the first ARP frame with the sender IP address of the first ARP frame, and further by associating the source MAC address of the first ARP frame and the sender IP address of the first ARP frame with an indication of the interface of the first router via which the first ARP frame was received by the first router and possibly the RI identifier of that interface. The method may further comprise the second node generating a second ARP frame and sending the second ARP frame to the second router. The second ARP frame may include at least: a source MAC address and a sender MAC address each of which corresponds to the MAC address of the second node, a sender IP address corresponding to the IP address of the second node, a target IP address corresponding to the sender IP address of the first ARP frame, and a destination MAC address and a target MAC address corresponding to the source MAC address and the sender MAC address, respectively, of the first ARP frame. The second router may receive the second ARP frame from the second node and subsequently replace each of the source MAC address and the sender MAC address of the second ARP frame with: the ID of the second router, the RI identifier of the (e.g., ingress) interface via which the second router received the second ARP frame, and the sender IP address of the second ARP frame. The second router may determine the ID of the first router from the destination MAC address of the second ARP frame, determine an interface of the second router via which to forward the second ARP frame based on the second router's routing table and the ID of the first router, and forward the second ARP frame via the determined interface. At least one of the transit router(s) may receive the second ARP frame, determine an interface of the transit router via which to forward the second ARP frame based on the transit router's routing table and the ID of the first router in the destination MAC address of the second ARP frame, and forward the second ARP frame via the determined interface. The first router may receive the second ARP frame, and, upon determining that the ID of the first router is included in the destination MAC address of the second ARP frame, determine an interface of the first router via which to send the second ARP frame to the first node using the ARP table of the first router by determining the interface of the first router which is associated with the IP address in the destination MAC address of the second ARP frame in the ARP table. The first router may send the second ARP frame to the first node using the determined interface.

The at least one of the transit router(s) may determine an interface of the transit router via which to forward the second ARP frame only based on the transit router's routing table and the ID of the first router in the destination MAC address of the second ARP frame. Thus, the at least one of the transit router(s) may determine the interface of the transit router(s) via which to forward the second ARP frame without the need to read the layer three part of the second ARP frame. Thereby, the process of determining to which entity to forward the frame may be less time-consuming, which may result in an increase of the frame forwarding speed of the transit router(s). Further, less computational resources of the transit router(s) may be needed for the transit router(s) to determine to which entity to forward the frame, which may result in an improvement of the performance of the transit routers in the network topology.

Prior to the first router sending the second ARP frame to the first node using the determined interface, the first router may determine which MAC address in the ARP table of the first router that is associated with the IP address in the destination MAC address of the second ARP frame, and may subsequently replace the destination MAC address of the second ARP frame with the determined MAC address.

The first node may receive the second ARP frame, and may, upon determining that the MAC address in the destination MAC address of the second ARP frame matches the MAC address of the first node, determine that the second ARP frame is intended for receipt by the first node.

Subsequent to the second router receiving the second ARP frame from the second node and prior to the replacing of the source MAC address and the sender MAC address of the second ARP frame, the second router may update its ARP table by associating the source MAC address of the second ARP frame with the sender IP address of the second ARP frame, and further by associating the source MAC address of the second ARP frame and the sender IP address of the second ARP frame with an indication of the interface of the second router via which the second ARP frame was received by the second router and possibly the RI identifier of that interface. The first node may generate a data frame and may send the data frame to the first router. The data frame may include: a source MAC address corresponding to the MAC address of the first node, a destination MAC address corresponding to the source MAC address of the second ARP frame, a source IP address corresponding to the IP address of the first node, and a destination IP address corresponding to the IP address of the second node. As the frame is a data frame, it may also include a payload. The first router may receive the data frame from the first node and subsequently replace the source MAC address of the data frame with: the ID of the first router, the RI identifier of the interface via which the first router received the data frame, and an IP address corresponding to the source IP address of the data frame. The first router may determine an interface of the first router via which to forward the data frame based on the first router's routing table and the ID of the second router in the destination MAC address of the data frame, and may forward the data frame via the determined interface. At least one of the transit router(s) may receive the data frame and may determine an interface of the transit router via which to forward the data frame based on the transit router's routing table and the ID of the second router in the destination MAC address of the data frame. The at least one of the transit router(s) may forward the data frame via the determined interface. The second router may receive the data frame, and may, upon determining that its ID is included in the destination MAC address of the data frame, determine an interface of the second router via which to send the data ARP frame to the second node using the ARP table of the second router by determining the interface of the second router which is associated with the IP address in the destination MAC address of the data frame in the ARP table. The second router may send the data frame to the second node using the determined interface.

The at least one of the transit router(s) may determine an interface of the transit router via which to forward the data frame only based on the transit router's routing table and the ID of the second router in the destination MAC address of the data frame. Thus, the at least one of the transit router(s) may determine the interface of the transit router(s) via which to forward the data frame without the need to read the layer three part of the data frame. Thereby, the process of determining to which entity to forward the frame may be less time-consuming, which may result in an increase of the frame forwarding speed of the transit router(s). Further, less computational resources of the transit router(s) may be needed for the transit router(s) to determine to which entity to forward the frame, which may result in an improvement of the performance of the transit routers in the network topology.

Prior to the second router sending the data frame to the second node using the determined interface, the second router may determine which MAC address in the ARP table of the second router that is associated with the IP address in the destination MAC address of the data frame, and may subsequently replace the destination MAC address of the data frame with the determined MAC address.

The second node may receive the data frame, and may, upon determining that the MAC address in the destination MAC address of the data frame matches the MAC address of the second node, determine that the data frame is intended for receipt by the second node.

The method and communication networks in accordance with the first and second aspects of the present invention described in the foregoing may be particularly relevant or applicable for the case of the first node and the second node being in the same subnet of the communications network. For the case of the first node and the second node being in different subnets of the communications network, a method and a communication network in accordance with the third and fourth aspects of the present invention described in the following may be particularly relevant or applicable.

According to a third aspect of the present invention, a method in a communications network, comprising a plurality of nodes including at least a first node and a second node connected via a plurality of routers including at least a first router, a second router and at least one transit router, is provided. The method is for facilitating conveying of at least one data frame from the first node to the second node via at least some of the plurality of routers, wherein the first router is directly connected to the first node and the second router is directly connected to the second node, and the at least one transit router is connected between the first router and the second router. Each router has at least two interfaces configured to receive and transmit frames, and each router is configured to maintain at least one instance of a routing table indicating available routes in the communications network between the router and the plurality of nodes. Each router has a unique ID and a unique IP address, and each interface of the router has an RI identifier indicating which instance(s) of routing table is or are permitted to be used for forwarding frames via the interface. Each of the first node and the second node has an IP address and a unique Medium Access Control, MAC, address. Each of any subnet of the communications network has a default gateway and each default gateway has an IP address, and wherein at each router, every subnet hosted by the router (e.g., all subnets which are available to the router) via any interface(s) of the router which are interfacing node(s) and the respective default gateway(s) of the subnet(s) are defined. At each node, the respective default gateway is defined (or known). The first router is the default gateway for the first node.

The method according to the third aspect of the present invention comprises the first node generating a first ARP frame and sending the first ARP frame to the first router. The first ARP frame includes at least: a source MAC address and a sender MAC address each of which corresponds to the MAC address of the first node, a sender IP address corresponding to the IP address of the first node, and a target IP address corresponding to the IP address of the default gateway at the first router. The first router receives the first ARP frame from the first node and, upon determining that the target IP address of the first ARP frame matches the IP address of the default gateway at the first router, generates a second ARP frame and sends the second ARP frame to the first node. The second ARP frame includes at least: a source MAC address and a sender MAC address each of which is set to include: the ID of the first router, the IP address of the default gateway at the first router, and the RI identifier of the (e.g., ingress) interface via which the first router received the first ARP frame. The RI identifier may be, e.g., a VRF number. The second ARP frame further includes a sender IP address corresponding to the IP address of the first router, a target IP address corresponding to the sender IP address of the first ARP frame, and a destination MAC address corresponding to the source MAC address of the first ARP frame. The first node receives the second ARP frame from the first router and, upon determining that the target IP address of the second ARP frame matches the IP address of the first node, determines the MAC address of the first node's default gateway as the source MAC address of the second ARP frame. The first node generates a data frame and sends the data frame to the first router, the data frame including at least: a destination MAC address corresponding to the MAC address of the first node's default gateway, a source MAC address corresponding to the MAC address of the first node, a source IP address corresponding to the IP address of the first node, and a destination IP address corresponding to the IP address of the second node. The first router receives the data frame from the first node and, upon determining that the destination MAC address of the data frame matches the MAC address of a default gateway of the first router while the destination IP address of the data frame does not match the IP address of the first router, generates a third ARP frame. The third ARP frame includes at least: a source MAC address and a sender MAC address each of which corresponds to the destination MAC address of the data frame, a sender IP address corresponding to the IP address of the first router, and a target IP address corresponding to the IP address of the second node. The first router, based on its routing table, determines that the second router hosts a subnet which the target IP address of the third ARP frame is part of and the ID of the second router, and subsequently sets a destination MAC address of the third ARP frame to include: the ID of the second router, the IP address of the default gateway of the said subnet, and a RI identifier indicating that any instance of routing table is permitted to be used for forwarding frames via the default gateway. The first router determines an interface of the first router via which to forward the third ARP frame based on the first router's routing table and the ID of the second router in the destination MAC address of the third ARP frame, and forwards the third ARP frame via the determined interface. At least one of the transit router(s) receives the third ARP frame, determines an interface of the transit router via which to forward the third ARP frame based on the transit router's routing table and the ID of the second router in the destination MAC address of the third ARP frame, and forwards the third ARP frame via the determined interface. The second router receives the third ARP frame, and, upon determining that the second router's ID is included in the destination MAC address of the third ARP frame, sends the third ARP frame via each interface of the second router that is directly connected to a node and for which the RI identifier matches the RI identifier of the source MAC address of the third ARP frame. The second node receives the third ARP frame, and, upon determining that the target IP address in the third ARP frame matches the IP address of the second node, determines that the third ARP frame is intended for receipt by the second node.

According to a fourth aspect of the present invention, a communications network is provided. The communications network comprises a plurality of routers, including at least a first router, a second router and at least one transit router, and a plurality of nodes, including at least a first node and a second node connected via the plurality of routers. The first router is directly connected to the first node and the second router is directly connected to the second node, and the at least one transit router is connected between the first router and the second router. Each router has at least two interfaces configured to receive and transmit frames, and each router is configured to maintain at least one instance of a routing table indicating available routes in the communications network between the router and the plurality of nodes. Each router has a unique ID and a unique IP address, and each interface of the router has a RI identifier indicating which instance(s) of routing table is or are permitted to be used for forwarding frames via the interface. The RI identifier may be, e.g., a VRF number. Each of the first node and the second node has an IP address and a unique Medium Access Control, MAC, address, wherein each of any subnet of the communications network has a default gateway and each default gateway has an IP address, and wherein at each router, every subnet hosted by the router via any interface(s) of the router which are interfacing node(s) and the respective default gateway(s) of the subnet(s) are defined, wherein at each node the respective default gateway is defined, wherein the first router is the default gateway for the first node. The first node includes a processor and a transmit/receive unit configured to generate a first ARP frame and send the first ARP frame to the first router. The first ARP frame includes at least: a source MAC address and a sender MAC address each of which corresponds to the MAC address of the first node, a sender IP address corresponding to the IP address of the first node, and a target IP address corresponding to the IP address of the default gateway at the first router. The first router includes a processor and a transmit/receive unit configured to receive the first ARP frame from the first node and, upon determining that the target IP address of the first ARP frame matches the IP address of the default gateway at the first router, generate a second ARP frame and send the second ARP frame to the first node. The second ARP frame includes at least: a source MAC address and a sender MAC address each of which is set to include: the ID of the first router, the IP address of the default gateway at the first router, and the RI identifier of the (e.g., ingress) interface via which the first router received the first ARP frame. The second ARP frame further includes a sender IP address corresponding to the IP address of the first router, a target IP address corresponding to the sender IP address of the first ARP frame, and a destination MAC address corresponding to the source MAC address of the first ARP frame. The processor and the transmit/receive unit of the first node are further configured to receive the second ARP frame from the first router and, upon determination that the target IP address of the second ARP frame matches the IP address of the first node, determine the MAC address of the first node's default gateway as the source MAC address of the second ARP frame. The processor and the transmit/receive unit of the first node are further configured to generate a data frame and send the data frame to the first router. The data frame includes at least: a destination MAC address corresponding to the MAC address of the first node's default gateway, a source MAC address corresponding to the MAC address of the first node, a source IP address corresponding to the IP address of the first node, and a destination IP address corresponding to the IP address of the second node. The first router receives the data frame from the first node and, upon determining that the destination MAC address of the data frame matches the MAC address of a default gateway of the first router while the destination IP address of the data frame does not match the IP address of the first router, generates a third ARP frame including at least: a source MAC address and a sender MAC address each of which corresponds to the destination MAC address of the data frame, a sender IP address corresponding to the IP address of the first router, and a target IP address corresponding to the IP address of the second node. The processor and the transmit/receive unit of the first router are further configured to, based on the routing table of the first router, determine that the second router hosts a subnet which the target IP address of the third ARP frame is part of and the ID of the second router, and subsequently set a destination MAC address of the third ARP frame to include: the ID of the second router, the IP address of the default gateway of the said subnet, and a RI identifier indicating that any instance of routing table is permitted to be used for forwarding frames via the default gateway. The processor and the transmit/receive unit of the first router are further configured to determine an interface of the first router via which to forward the third ARP frame based on the first router's routing table and the ID of the second router in the destination MAC address of the third ARP frame, and forward the third ARP frame via the determined interface. At least one of the transit router(s) includes a processor and a transmit/receive unit configured to receive the third ARP frame, determine an interface of the transit router via which to forward the third ARP frame based on the transit router's routing table and the ID of the second router in the destination MAC address of the third ARP frame, and forward the third ARP frame via the determined interface. The second router includes a processor and a transmit/receive unit configured to receive the third ARP frame, and, upon determination that the second router's ID is included in the destination MAC address of the third ARP frame, send the third ARP frame via each interface of the second router that is directly connected to a node and for which the RI identifier matches the RI identifier of the source MAC address of the third ARP frame. The second node includes a processor and a transmit/receive unit configured to receive the third ARP frame, and, upon determination that the target IP address in the third ARP frame matches the IP address of the second node, determine that the third ARP frame is intended for receipt by the second node.

As mentioned, at least one of the transit router(s) may receive the third ARP frame and determine an interface of the transit router via which to forward the third ARP frame based on the transit router's routing table and the ID of the second router in the destination MAC address of the third ARP frame. Thus, the at least one of the transit router(s) may determine the interface of the transit router(s) via which to forward the third ARP frame without the need to read the layer three part of the third ARP frame. Thereby, the process of determining to which entity to forward the frame (e.g., the third ARP frame) may be less time-consuming, which may result in an increase of the frame forwarding speed of the transit router(s). Further, less computational resources of the transit router(s) may be needed for the transit router(s) to determine to which entity to forward the frame, which may result in an improvement of the performance of the transit routers in the network topology. Accordingly, according to one or more embodiments of the present invention, the at least one of the transit router(s) receiving the third ARP frame determines the interface of the transit router via which to forward the third ARP frame only based on the transit router's routing table and the ID of the second router in the destination MAC address of the third ARP frame.

The second node may generate a fourth ARP frame and may send the fourth ARP frame to the second router. The fourth ARP frame may include at least: a source MAC address and a sender MAC address each of which corresponds to the MAC address of the second node, a sender IP address corresponding to the IP address of the second node, a target IP address corresponding to the sender IP address of the third ARP frame, and a destination MAC address and a target MAC address corresponding to the source MAC address and the sender MAC address, respectively, of the third ARP frame. The second router may receive the fourth ARP frame from the second node and may subsequently replace each of the source MAC address and the sender MAC address of the fourth ARP frame with: the ID of the second router, the RI identifier of the (e.g., ingress) interface via which the second router received the fourth ARP frame, and the sender IP address of the fourth ARP frame. The second router may determine the ID of the first router from the destination MAC address of the fourth ARP frame, may determine an interface of the second router via which to forward the second ARP frame based on the second router's routing table and the ID of the first router, and may forward the fourth ARP frame via the determined interface. At least one of the transit router(s) may receive the fourth ARP frame, may determine an interface of the transit router via which to forward the fourth ARP frame based on the transit router's routing table and the ID of the first router in the destination MAC address of the fourth ARP frame, and may forward the fourth ARP frame via the determined interface. The first router may receive the fourth ARP frame, and may, upon determining that the ID of the first router is included in the destination MAC address of the fourth ARP frame, determine that the fourth ARP frame is intended for receipt by the first router.

Subsequent to the second router receiving the fourth ARP frame from the second node and prior to the replacing of the source MAC address and the sender MAC address of the fourth ARP frame, the second router may update its ARP table by associating the source MAC address of the fourth ARP frame with the sender IP address of the fourth ARP frame, and further by associating the source MAC address of the fourth ARP frame and the sender IP address of the fourth ARP frame with an indication of the interface of the second router via which the fourth ARP frame was received by the second router and possibly the RI identifier of that interface. The first router may replace the source MAC address of the data frame with the destination MAC address of the data frame (which may correspond to the MAC address of the first node's default gateway) and may subsequently replace the destination MAC address of the data frame with the source MAC address of the fourth ARP frame. The first router may determine an interface of the first router via which to forward the data frame based on the first router's routing table and the ID of the second router in the destination MAC address of the data frame, and may forward the data frame via the determined interface. At least one of the transit router(s) may receive the data frame, may determine an interface of the transit router via which to forward the data frame based on the transit router's routing table and the ID of the second router in the destination MAC address of the data frame, and may forward the data frame via the determined interface. The second router may receive the data frame, and may, upon determining that its ID is included in the destination MAC address of the data frame, determine an interface of the second router via which to send the data ARP frame to the second node using the ARP table of the second router by determining the interface of the second router which is associated with the IP address in the destination MAC address of the data frame in the ARP table. The second router may send the data frame to the second node using the determined interface.

The at least one of the transit router(s) may determine an interface of the transit router via which to forward the data frame only based on the transit router's routing table and the ID of the second router in the destination MAC address of the data frame. Thus, the at least one of the transit router(s) may determine the interface of the transit router(s) via which to forward the data frame without the need to read the layer three part of the data frame. Thereby, the process of determining to which entity to forward the frame may be less time-consuming, which may result in an increase of the frame forwarding speed of the transit router(s). Further, less computational resources of the transit router(s) may be needed for the transit router(s) to determine to which entity to forward the frame, which may result in an improvement of the performance of the transit routers in the network topology.

Prior to the second router sending the data frame to the second node using the determined interface, the second router may determine which MAC address in the ARP table of the second router that is associated with the IP address in the destination MAC address of the data frame, and may subsequently replace the destination MAC address of the data frame with the determined MAC address.

The second node may receive the data frame, and may, upon determining that the MAC address in the destination MAC address of the data frame matches the MAC address of the second node, determine that the data frame is intended for receipt by the second node.

It is to be understood that for any of the embodiments of the present invention described herein, for each of the herein described operations of each or any of the plurality of nodes (e.g., the first node and/or the second node) and/or each or any of the plurality of routers (e.g., the first router, the second router and/or each or any of the at least one transit router), the respective node or router may include a processor and/or a transmit/receive unit configured to carry out the operation(s).

Each or any of the nodes (e.g., the first node and/or the second node) may for example comprise a server.

For illustrating principles of one or more embodiments of the present invention, MIPR may be implemented as follows, or substantially as follows, by carrying out one or more of the steps or operations O1 to O15 below (cf. description below of terminology which may be used herein for facilitating understanding of the illustrated embodiments).

O1. A unique ID, IP address, and a MIPR MAC address may be assigned to each router.

O2. The gateway IP address of any connected subnet to a router may be defined on that router. A MIPR MAC address may also be assigned to that IP address.

O3. A routing protocol may run on all routers to make a routing table on each router for determining the 'best' path between routers.

O4. A first node may send out an ARP request to find out the MAC address of a second node.

O5. After the first router receives this ARP request, it may send different copies of a target ARP frame to the target routers using its ARP table.

O6. The next router, which may be a transit router, may receive and forward the target ARP frame toward the target router using its routing table.

O7. After the target router has received the target ARP, it may replace its MIPR MAC inside the destination MAC address field of the frame with "FF" (or the like) and may flood the ARP request frame on all its access ports.

O8. The second node may send out an ARP reply as a response to the first node.

O9. The second router may receive this ARP reply frame. The second router may replace the ARP reply frame's source MAC address and sender MAC address with a MIPR MAC and may use its routing table to forward the ARP reply frame toward the first router.

O10. The next router, which may be a transit router, may receive and forward the ARP reply frame toward the first router using its routing table.

O11. The first router may receive the ARP reply frame. The first router may determine or fetch the router ID from the MIPR MAC inside the destination MAC address field of the frame to look up the original MAC address of the first node from its ARP table. Then the first router may replace the MIPR MAC inside the destination and target MAC address field of the ARP reply frame with the original MAC address of the first node. The first router may forward the ARP reply frame to the first node.

O12. The first node may want to send a unicast data frame to the second node.

O13. The first router may receive the unicast data frame. The first router may only look at the layer-two part of the frame. The first router may replace the source MAC address field of the unicast data frame with a MIPR MAC. The first router may use its ARP table to forward the unicast data frame to the next router by looking up the second router's ID from the MIPR MAC inside the destination MAC address field of the frame.

O14. The next router, the transit router, may receive and then forward the unicast data frame to the second router by looking up the second router's ID from the MIPR MAC inside the destination MAC address field of the frame.

O15. The second router may receive the frame. The second router may determine or fetch the router ID from the MIPR MAC inside the destination MAC address field of the frame to look up the original MAC address of the second node from its ARP table. Then the second router may replace the MIPR MAC inside the destination MAC address field of the unicast frame with the original MAC address of the second node. The second router may forward the unicast data frame to the second node.

In the following items (i) to (vii), descriptions of some characteristics and advantages related to MIPR are provided.

(i) When a frame is a unicast data frame, none of the first, transit, or second routers may need to look at the L3 part of the frame. All routers may transfer the frame only by looking at the L2 part of the frame. The routing decision may therefore be based on the L2 part of the frame, and not on the L3 part of the frame. This may significantly increase the speed of data frame transmission and the performance of the routers.

(ii) By means of MIPR, traffic may be transferred between nodes in the same VRF on separate routers without needing specific routing protocols such as IS-IS, MPLS, BGP, etc.

(iii) In conventional routing mechanisms, when a frame passes through different routers, each router must change the L2 part of the frame, including the source and destination MAC address fields. But in MIPR, this process may need to be done only on the first router and the second router. There may be no need for any transit router to replace the L2 part of the frame. This may also significantly increase the speed of data frame transmission and the performance of the routers.

(iv) In conventional routing mechanisms/technologies, all nodes in the same subnet in the network topology may need to connect to a single router's interface. But in MIPR, it may be possible for any node to connect anywhere in the network irrespective of the subnet it belongs to.

(v) With respect to routing protocols, a network topology based on MIPR may have a much higher stability than conventional network topologies. In conventional network topologies, if a router's port becomes inoperative, this may trigger the routing protocol to send several updates in the whole network topology between all routers to rerun the routing protocol and update the router's routing table. But in MIPR, because the connected subnets to each router may be set in each router, MIPR may be very stable in relation to any changes in the network topology.

(vi) Routers may not need to update their ARP tables whenever they receive a frame. Instead, they may need to update their ARP tables only when they receive a frame from an access port. Therefore, an ARP table may not be needed for a transit router or for a router with no access port.

(vii) MIPR does not require changes to the standard frame size of the frame. There is no need for any extra header, field, or capsulation with respect to the standard frame.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the invention will be described below with reference to the accompanying drawings.

Figure 4:
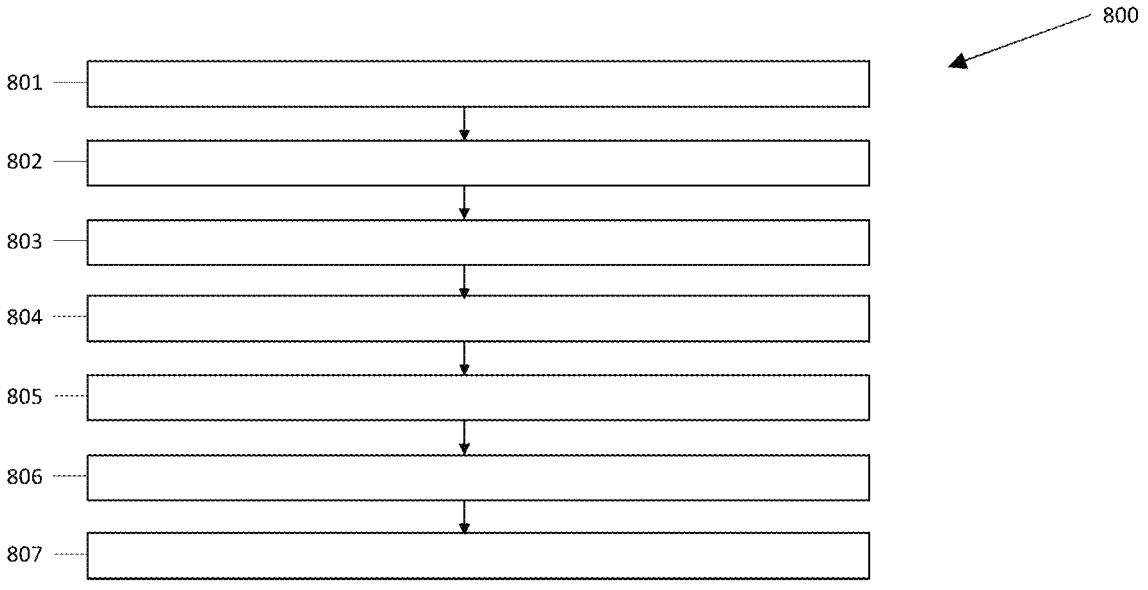
Figure 5:
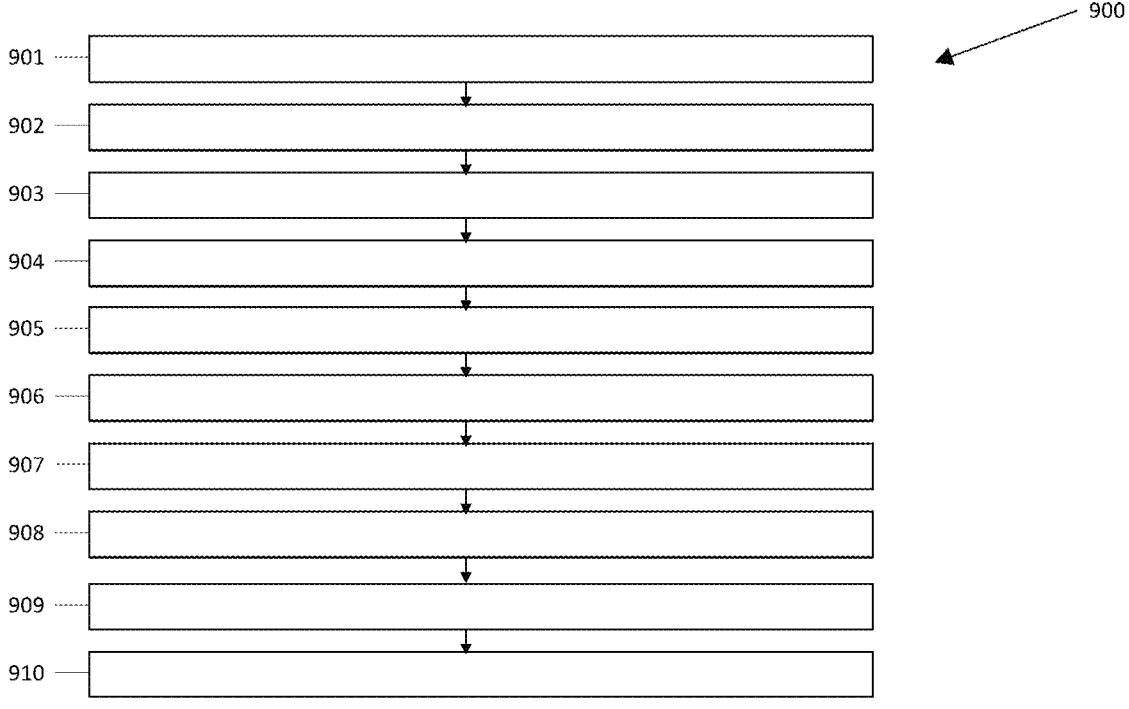

Each of FIGS. 4 and 5 is a schematic flowchart of a method according to an embodiment of the present invention.

All the figures are schematic, not necessarily to scale, and generally only show parts which are necessary in order to elucidate embodiments of the present invention, wherein other parts may be omitted or merely suggested.

DESCRIPTION WITH REFERENCE TO THE DRAWINGS

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

For facilitating understanding of the illustrated embodiments, the following terminology may be used herein, in particular in the following description relating to the drawings:

"first node": a node that wants to initiate communication with another node.

"second node": a node which is in the same subnet as the first node, and the first node wants to initiate communication with the second node.

"third node": a node which is in a subnet different from the subnet which the first node is in, and the first node wants to initiate communication with the third node.

"first router": a router that is directly connected to a first node.

"second router": a router that is directly connected to a second node, or to a third node.

"next router(s) or transit router(s)": one or more routers which are not directly connected to the first node, the second node, or the third node. A transit router is arranged intermediate or between a first router and a second router. Traffic from a first router to a second router may pass through one or more transit routers.

"access port": a port of a router that is connected to a node.

"arch port": a port of a router that is connected to another router.

"MIPR MAC format": a format of a customized MAC address, which includes or consists of a router ID, a VRF number, and an IP address. Each of these fields may get different values based on different situations.

"target ARP frame": This is an ARP request frame modified by the first router to send to target routers. The first router modifies the ARP request frame sent by the first node in a way that the source and sender MAC address fields are replaced with a MIPR MAC address. And the destination MAC address field is replaced with the MAC address of the default gateway IP address of the target IP address field of the ARP request frame.

"target router": a router that a first router chooses to send a copy of a target ARP frame to. Target routers are the routers which host a subnet which is the same as the subnet of the target IP address of the ARP request frame.

"ingress port": The port of a router via which the router receives a frame.

"egress port": The port of a router via which the router sends out a frame.

"gateway port": This is a port of a router mapped to a specific router ID in the router's routing table. This port is the egress port for forwarding a frame to that specific router.

In order to further facilitate understanding of the illustrated embodiments, the following networking concepts may be used herein, in particular in the following description relating to the drawings.

Structure of a standard data frame (herein, "MAC" and "MAC address" may be used interchangeably):

| Layer 2 address | | Ether | Payload |
|---|---|---|---|
| Destination MAC address | Source MAC address | Type XXXX | (Including L3 header) |
| "MAC of second node" | "MAC of first node" | | |

"Ether type" may be a two-byte entry that indicates what the type of the frame is. For instance, a frame with the entry 0806h for "Ether type" indicates that the frame is an ARP frame, and frame with the entry 8870h for "Ether type" indicates that the frame is an ethernet frame.

| Standard Broadcast frame: | | | |
|---|---|---|---|
| Layer 2 address | | Ether | Payload |
| Destination MAC address | Source MAC address | Type Ethernet | (Including L3 header) |
| FF-FF-FF-FF-FF-FF | "MAC of the first node" | 88:70 | |

A frame with FF-FF-FF-FF-FF-FF (hexadecimal format) on its destination MAC address filed when its "ether type" field does not indicate an ARP frame. It means its "ether type" entry is something other than "0806h". This address does not point to any specific host. If a router receives a typical broadcast frame, it drops the frame. Broadcast frames cannot pass through routers.

For example, the ether type in the above frame indicates that the frame is an ethernet frame.

FF-FF-FF-FF-FF-FF is a hexadecimal format of a broadcast entry in a MAC address field. Herein, "FF" is to be understood as a short form of FF-FF-FF-FF-FF-FF.

| Standard ARP request frame: | | | | | | |
|---|---|---|---|---|---|---|
| Layer 2 address | | | ARP Request header | | | |
| Destination MAC address | Source MAC address | Ether Type ARP | Sender MAC address | Sender IP address | Target MAC address | Target IP address |
| FF-FF-FF-FF-FF-FF | "MAC address of first node" | 08:06 | "MAC address of first node" | "first node's IP address" | 00-00-00-00-00-00 | "second node's IP address" |

The ARP request frame is a frame sent by a first node to find out the MAC address of a second node.

A frame with FF-FF-FF-FF-FF-FF (hexadecimal format) on its destination MAC address filed when its "ether Type" field indicates an ARP frame. It means its "ether type" is "0806h". This address does not point to any specific host. When a node receives an ARP request frame, it may respond to the requester with an ARP reply frame. Routers also may respond to an ARP request frame when they 'see' their own MAC address inside the target IP field of the frame.

As shown, the source and sender MAC address entry of the ARP request frame is the MAC address of the first node. The destination MAC address is set to FF because the first node does not 'know' the second node's MAC address, so this frame should reach all nodes. The target MAC address field is "0". It's because the MAC address of the second node is unknown for the first node.

| Standard ARP reply frame: | | | | | | |
|---|---|---|---|---|---|---|
| Layer 2 address | | | ARP reply header | | | |
| Destination MAC address | Source MAC address | Ether Type ARP | Sender MAC address | Sender IP address | Target MAC address | Target IP address |
| "MAC of the first node" | "MAC of the second node" | 08:06 | "second node's MAC' | "second node's IP" | "first node's MAC" | "first node's IP" |

A frame with a specific destination MAC address points to a particular node when its "ether Type" field indicates an ARP frame. The frame is like a typical unicast frame when its "ether type" is "0806h".

It can be seen that both the "destination" and "target" MAC address fields are non-broadcast MAC addresses. The ARP reply is a frame from a second node that sends its MAC address to the requester (first node).

To send a reply to an already received ARP request, the node that sends the ARP reply may put its MAC address inside the source and sender MAC address field and sets the "target MAC address" field of the ARP reply frame, the entry of the "sender MAC address" field already received by the ARP request frame.

| Standard unicast frame: | | | |
|---|---|---|---|
| Layer 2 address | | | Payload |
| Destination MAC address | Source MAC address | Ether Type Ethernet | (Including L3 header) |
| "MAC of Second node" | "MAC of First node" | 88:70 | |

A frame with a specific destination MAC address points to a particular node when its "ether Type" field does not indicate an ARP frame. It means its "ether type" is something other than "0806h".

Figure 1:
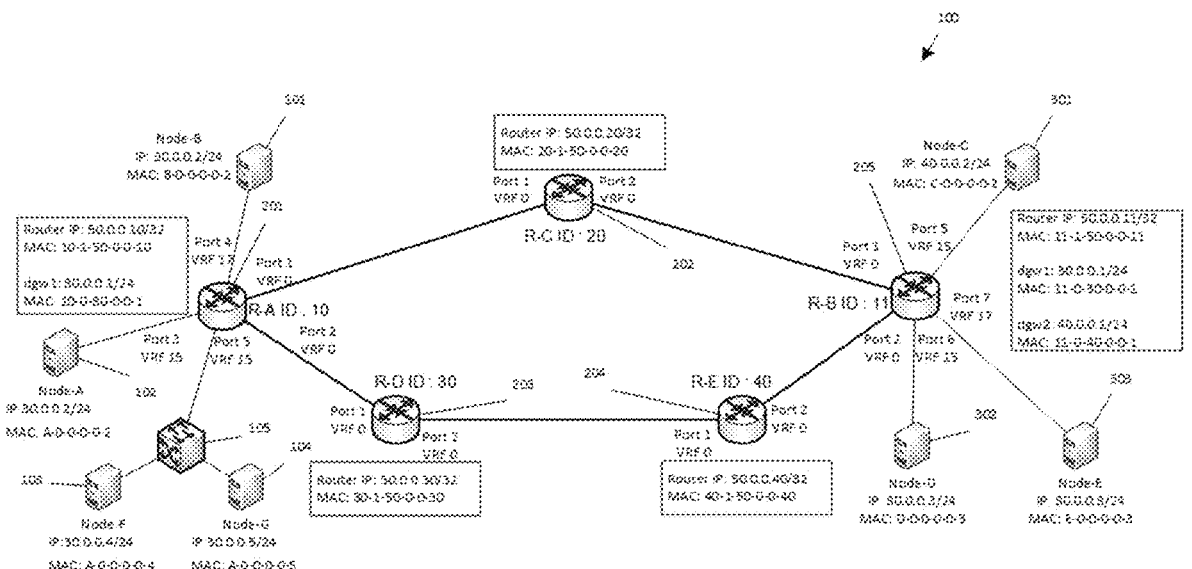
FIG. 1 is a schematic view of a communications network in accordance with one or more embodiments of the present invention.

FIG. 1 is a schematic view of a communications network 100 in accordance with one or more embodiments of the present invention.

The communications network 100 comprises a plurality of routers 201, 202, 203, 204, 205, which are also referenced in FIG. 1 as R-A, R-C, R-D, R-E, R-B, respectively. The communications network 100 further comprises a plurality of nodes 101, 102, 103, 104, 301, 302, 303, which are also referenced in FIG. 1 as Node-B. Node-A, Node-F, Node-G, Node-C, Node-D, Node-E, respectively.

As indicated in FIG. 1, the routers 202, 203, 204 (R-C, R-D, R-E) are transit routers, as they are not directly connected to any of the nodes.

As also indicated in FIG. 1, each of the nodes may comprise a server.

One or more embodiments of the present invention are directed to facilitating conveying of at least one data frame from a first node to a second node via at least some of the plurality of routers.

Embodiments of the present invention will be described in the following in relation to two different example scenarios—(1) when the first node and the second node are in the same subnet and (2) when the first node and the second node are in different subnets.

However, before describing embodiments of the present invention in relation to each of these two examples scenarios further, some operations which may be carried out for facilitating implementing MIPR will be described in the following points 1) to 9).

1) Each router may need to have a unique ID in the network topology. This ID may be assigned automatically by a protocol that runs between routers or set manually by a network administrator. Example router IDs, which are also indicated in FIG. 1, can be as follows:

Router-A (R-A): 10
 Router-B (R-B): 11
 Router-C (R-C): 20
 Router-D (R-D): 30
 Router-E (R-E): 40

2) Any port in each of the routers may be defined with regard to if the port is an access port or an arch port. For example:

Router R-A:
 Arch ports: 1, 2
 Access Ports: 3, 4
 Router R-B:
 Arch ports: 1, 2
 Access ports: 5, 6, 7
 Router R-C:
 Arch ports: 1, 2
 Access ports:—

3) All available subnets and their default gateway may be defined at any router that has at least an access port on that subnet.

For example, according to the example illustrated in FIG. 1, R-A has only an access port on subnet 30.0.0.0/24. So, in this case, only this subnet and its gateway need to be defined in router R-A:

Subnet 1:
IP/Mask: 30.0.0.0/24
Default gateway: 30.0.0.1

While in router R-B, there are two subnets under its access ports:

Subnet 1:
IP/Mask: 30.0.0.0/24
Default gateway: 30.0.0.1
Subnet 2:
IP/Mask: 40.0.0.0/24
Default gateway: 40.0.0.1

But in R-C, there is no access port. In this case, there is no need to define any gateways there.

4) A unique MIPR MAC address may be assigned to each default gateway (dgw) IP address on each router. This unique MIPR MAC address may comprise the Router ID, a VRF number, and the gateway IP address. This procedure will be described further in the following. The VRF number for the MIPR MAC of the default gateway IP address may always be set to "0".

Router R-A:
dgw: 30.0.0.1/24
MAC: 10-0-30-0-0-1
Router R-B:
dgw 1:30.0.0.1/24
MAC: 11-0-30-0-0-1
dgw 2:40.0.0.1/24
MAC: 11-0-40-0-0-1

5) Every router port may be assigned to a specific VRF number. It is included both "arch port" and "access port."

The communications network may be implemented such that two nodes can only communicate if they are in the same VRF.

VRF #0 may mean that the port with this VRF can transfer traffic for all VRFs. This may be used for arch ports to make it possible to transfer traffic for all VRFs even though an arch port can still be limited to some specific VRFs. This may be helpful in having control over what traffic should transfer to which destinations.

As indicated in FIG. 1, all ports may belong to or be associated with a VRF. As an example, some of them may be considered for illustrating principles of communication between different nodes when they belong to or are associated with different VRFs:

Router R-A: Port 3 (access port)
VRF 15
It means Node-A, which is connected to this port, can receive only the traffic belonging to VRF 15.
Router R-A: Port 1 (Arch port)
VRF 0
It means all traffic belonging to all VRFs may pass through this port.

A port of a router may be connected to a switch supporting several connected nodes (cf., switch 105 illustrated in FIG. 1). If that would be the case, it would however not change the principles of MIPR. Still, assigning that port to an access port and specifying its VRF ID should be done. It is the same as a port that it is connected directly to a node. The operating principles of MIPR to receive or forward a frame through this port is the same as when a node is directly connected to a router.

As an example, FIG. 1 shows that Node-F and Node-G with IP addresses in different subnets are connected to the router R-A through port 5. The port is set as an access port, and the VRF ID 15 is assigned to the port. So, it means Node-F and Node-G can communicate only to other nodes connected to VRF 15 in any router in the network topology.

Router R-A: Port 4
VRF 17
It means Node-B, which is connected to this port, can receive only the traffic belonging to VRF 17. Node-A and Node-B would not be able to communicate as they belong to different VRFs.
Router R-B: Port 7
VRF 17
It means Node-E, which is connected to this port, can receive only the traffic belonging to VRF 17. So, Node-E can communicate only with Node-B as they are both in the same VRF, 17.
Router R-B: Port 5
VRF 15
It means Node-C, which is connected to this port, can receive only the traffic belonging to VRF 15.

Node-A, Node-C, and Node-D are in the same VRF. So, in this case, these three nodes can communicate when the routing is in place.

6) Conventionally, any port in a router would need to configure in L3 mode. In that case, each port must have an IP address in a subnet different from the other ports' IP addresses. But according to MIPR, all ports may need to configure in L2 mode. This means there is no need to assign any IP address to the port.

7) A unique IP address may be assigned to each router. This IP address should be chosen from a subnet different from any other subnet assigned to the nodes connected to the router's access ports. This IP address may be named "Router IP". In accordance with the example illustrated in FIG. 1:

Router-A (R-A):
IP: 50.0.0.10/32
Router-B (R-B):
IP: 50.0.0.11/32
Router-C (R-C):
IP: 50.0.0.20/32
Router-D (R-D):
IP: 50.0.0.30/32
Router-E (R-E):
IP: 50.0.0.40/32

8) A unique MIPR MAC address should be assigned to each Router IP address on each router. This will be described further in the following. The VRF number for the modified MAC of the Router IP may be always set to "1".

Router-A (R-A):
IP: 50.0.0.10/32
MAC: Oct. 1, 1950-0-0-10
Router-B (R-B):
IP: 50.0.0.11/32
MAC: Nov. 1, 1950-0-0-11
Router-C (R-C):
IP: 50.0.0.20/32
MAC: 20-1-50-0-0-20
Router-D (R-D):
IP: 50.0.0.30/32
MAC: 30-1-50-0-0-30
Router-E (R-E):
IP: 50.0.0.40/32
MAC: 30-1-50-0-0-30

VRF #1 indicates this is a routing protocol update frame, not a data frame. In accordance with MIPR, when a router receives a frame, this indicator may be used to recognize if a frame is a data frame or a routing protocol update frame just by looking at the L2 part of the frame. Then router can decide to 'look' only at L2 part of the frame (if this is a non-routing protocols update frame) or at the whole part of the frame (if it is a routing protocol update frame).

9) A routing protocol may run in the network to determine the best paths between the routers. Doing this may give all routers a routing table indicating the best path to reach the other routers. The routing tables may also indicate which subnets the respective routers host.

In standard routing protocols, when a router wants to communicate with other routers to exchange its routing information, it will generally use the egress port's MAC and IP address as the source address. But in accordance with MIPR, it doesn't matter what port a router uses to exchange its routing information. In all directions to the other router, the router uses its single unique Router IP and the mapped MAC address to that IP address as the source address.

| Router R-A: routing table: | | | | |
|---|---|---|---|---|
| Best path | Router ID | Gateway Port | VRF for Gateway port | Hosted Subnets |
| * | 11 | 1 | 0 | 30.0.0.0/24 40.0.0.0/24 |
| | 11 | 2 | 0 | 30.0.0.0/24 40.0.0.0/24 |

Above is an example illustrating a routing table of router R-A. As can be seen, the routing table has only two records about a router with ID 11 (i.e., Router R-B). Because the other routers in the network topology do not have any access ports, the router R-A only needs to 'know' about router R-B and its hosted subnets. This routing table indicates to the router R-A that there are two paths or routes to reach another router with ID 11 (router R-B). One through port 1 and the other through port 2. The "*" indicates which path is the best path. The other route remains in the routing table as a backup route if the best route would become inoperable.

| Router R-B: routing table: | | | | |
|---|---|---|---|---|
| Best path | Router ID | Gateway Port | VRF for Gateway port | Hosted Subnets |
| * | 10 | 1 | 0 | 30.0.0.0/24 |
| | 10 | 2 | 0 | 30.0.0.0/24 |

Above is an example illustrating a routing table of router R-B. As can be seen, hosted subnet for the router with ID 10 (router R-A) is only 30.0.0.0/24. That is because unlike the router R-B the router R-A only hosts one subnet, which is 30.0.0.0/24.

| Router R-C: routing table: | | | | |
|---|---|---|---|---|
| Best path | Router ID | Gateway Port | VRF for Gateway port | Hosted Subnets |
| * | 10 | 1 | 0 | 30.0.0.0/24 |
| * | 11 | 2 | 0 | 30.0.0.0/24 40.0.0.0/24 |

| Router R-D: routing table: | | | | |
|---|---|---|---|---|
| Best path | Router ID | Gateway Port | VRF for Gateway port | Hosted Subnets |
| * | 10 | 1 | 0 | 30.0.0.0/24 |
| * | 11 | 2 | 0 | 30.0.0.0/24 40.0.0.0/24 |

| Router R-E: routing table: | | | | |
|---|---|---|---|---|
| Best path | Router ID | Gateway Port | VRF for Gateway port | Hosted Subnets |
| * | 10 | 1 | 0 | 30.0.0.0/24 |
| * | 11 | 2 | 0 | 30.0.0.0/24 40.0.0.0/24 |

Above are examples illustrating routing tables of the routers R-C, and R-D and R-E.

As mentioned, one or more embodiments of the present invention are directed to facilitating conveying of at least one data frame from a first node to a second node via at least some of the plurality of routers.

Example Scenario 1: The First Node and the Second Node are in the Same Subnet In this example scenario, the first node and the second are in the same subnet and the same VRF and want to communicate with each other.

With reference to FIG. 1, the first node and the second node may in the present example scenario for example be Node-A, 102, and Node-D, 302, respectively.

Example A1 of Example Scenario 1: An ARP Request Frame a) The first node, Node-A, generates and sends out an ARP request frame to find out the MAC address of the second node Node-D.

The ARP request frame sent out by Node-A may be configured according to the following:

| Layer 2 address | | ARP (request) | | | |
|---|---|---|---|---|---|
| Destination MAC address | Source MAC address | Sender MAC address | Sender IP address | Target MAC address | Target IP address |
| "FF" | A-0-0-0-0-2 | A-0-0-0-0-2 | 30.0.0.2 | 00 | 30.0.0.3 | b) The first directly connected router, router R-A, receives this ARP request frame.

c) This is the "first router" (cf. description above of terminology which may be used herein for facilitating understanding of the illustrated embodiments), because the frame arrives from an access port. And it is an ARP request. Because of these two reasons:

I. The first router looks at the whole part of the frame.

II. It may update its ARP table by adding the frame's source IP and source MAC address field, plus the ingress port's port number and VRF number.

| Router R-A's ARP Table: | | | |
|---|---|---|---|
| IP address | Source MAC | VRF | Port |
| 30.0.0.2 | A-0-0-0-0-2 | 15 | 3 | d) Because this is an ARP frame (it doesn't matter if it is an ARP request frame or ARP reply frame), the first router replaces the source and sender MAC address field of the frame with a MIPR MAC format. MIPR MAC here is a combination of the Source IP address entry of the frame, the VRF number of the ingress port, and the ID of the first router.

Router ID (e.g., 1-byte): 10

VRF number (e.g., 1-byte): 15

Source IP address of the frame (e.g., 4-bytes): 30.0.0.2

This is the original Source MAC address field of the frame:

| $1^{st}$ byte | $2^{nd}$ byte | $3^{rd}$ byte | $4^{th}$ byte | 5th byte | $6^{th}$ byte |
|---|---|---|---|---|---|
| A | 0 | 0 | 0 | 0 | 2 |

This is the new MIPR MAC to replace with the source and sender MAC address field inside the arrived ARP request frame:

| Router ID | VRF | IP Address | | | |
|---|---|---|---|---|---|
| 10 | 15 | 30 | 0 | 0 | 2 |

This replacement of a MAC address field of the frame with a MIPR MAC may be referred to as: "MIPR MAC Replacement."

Router ID and VRF ID fields do not have a fixed size. Herein, one byte (8 bits) of MAC address is assigned to each of them, but this may be changed based on the situation. For instance, 4 bits may be assigned for Router ID and 12 bits may be assigned for VRF number.

MIPR may support 16 routers or more, and more than 4000 VRFs in the topology.

e) The first router looks at its routing table to see what routers host a subnet that is the same as the subnet as the target IP address field. In the illustrated example, it is only router R-B. This router may be referred to as the target router. Then, router R-A may replace the destination MAC address field of the arrived frame with the MAC address of the default gateway on the target router. The router R-A does not need to 'know' that MAC address. Instead, the router R-A may generate that MAC address. By looking at the arrived frame, it can be seen that the target IP address is 30.0.0.2, which is part of the subnet 30.0.0.0/24, and its default gateway is 30.0.0.1. And by looking at router R-A's routing table, the router R-A can determined that the target router with ID 11 hosts this subnet. Now R-A has the IP address (30.0.0.1) and router ID (11) to generate the real MAC address assigned to the default gateway of the proper subnet (30.0.0.0/24) on the target router (R-B).

The only remaining field is the VRF number. R-A sets the VRF number to 0, the default VRF number for the default gateways on the target routers.

Now R-A can generate the MAC address for this default gateway set on the target router:

| Router ID | VRF | IP Address | | | |
|---|---|---|---|---|---|
| 11 | 0 | 30 | 0 | 0 | 1 |

If there is more than one target router, the first router may create different copies of the frame and send them individually to each target router. But in the illustrated example, there is only one target router.

The final modified frame by router R-A may be as follows:

| Layer 2 address | | ARP (request) | | | |
|---|---|---|---|---|---|
| Destination MAC address | Source MAC address | Sender MAC address | Sender IP address | Target MAC address | Target IP address |
| 11-0-30-0-0-1 | 10-15-30-0-0-2 | 10-15-30-0-0-2 | 30.0.0.2 | 00 | 30.0.0.3 |

As can be seen, the ARP request frame is not a broadcast frame anymore. Instead, it is a unicast frame.

The procedure of creating different copies of the ARP request frame by replacing the destination MAC address field of the frame with the target router's MAC address may be referred to as "MIPR ARP Request Modification."

f) As the next step, the first router forwards the frame through the best path to those target routers. To do this, the router R-A looks at its routing table to see the best path to reach the target routers. Then it sends out the frames on the gateway port only if the gateway port is in the same VRF number as the ingress port or ports with VRF 0, which is allowed to carry all VRF numbers.

This forwarding decision process to choose the right gateway port may be referred to as: "MIPR Next Router forwarding."

In the illustrated example, only one copy of the frame needs to be sent out, which is to router R-B. Based on the router R-A's routing table, the gateway port for the best path to reach R-B is port 1. Thus, the router R-B may then send out the frame on its port number 1.

As can be seen, the first router does not need to get the MAC address of the next router to forward the frame. It just needs to send out the frame to the gateway port.

It can be noted that the ARP request, which was originally a broadcast frame, now works as a unicast frame to reach specific target routers. By removing this kind of ARP request, MIPR may decrease the broadcast traffic in the topology, which in turn may cause a better network performance and better utilization of network resources.

g) The next router, router R-C, receives the frame. Because this frame arrives from an arch port, the router may first need to know if this is a routing protocol update frame or a standard data frame. To that end, the router may check the VRF number field inside the source MAC address field of the frame. If the VRF number is 1, this frame is a routing protocol update frame. In this case, the router looks at the other part of the frame to use it for updating its routing table. Otherwise, this frame is not a routing protocol update frame, so this router is either a transit or a second router.

Because this frame is a standard data frame (non-routing protocol updating frame) that arrives from an arch port, the router does not need to update its ARP table.

The router looks at the destination MAC address field of the frame. If the router sees its own ID inside the MAC address, this router is a second router otherwise, it is a transit router.

In the present example, the destination MAC address is:

| Router ID | VRF | | IP Address | | |
| --- | --- | --- | --- | --- | --- |
| 11 | 0 | 30 | 0 | 0 | 1 |

The Router ID inside the destination MAC address is 11, while the Router ID of this router is 20. Therefore, this router is a transit router.

This process identifies whether the frame is a non-routing protocol update frame or a standard data frame, and if the router is a destination or transit router, and may be referred to as "MIPR Arch Receiving" procedure.

Then the router looks up this Router ID in its routing table to find out the correct gateway port.

Router R-C: Routing table:

| Best path | Router ID | Gateway Port | VRF for Gateway port | Hosted Subnets |
| --- | --- | --- | --- | --- |
| * | 10 | 1 | 0 | 30.0.0.0/24 |
| * | 11 | 2 | 0 | 30.0.0.0/24 |
| | | | | 40.0.0.0/24 |

The routing table shows the gateway port to reach the router with ID 11 (router R-B) is port 2.

h) The router R-C sends the frame out through port 2, following the "MIPR Next Router forwarding" procedure. A transit router may only look at the L2 part of the frame to route the frame, and there is no need to update the ARP table.

i) The next router, router R-B, receives the frame. Because this frame arrives from an arch port, the router R-B considers the "MIPR Arch Receiving" conditions. So, the frame is not a routing protocol update frame, and no need to update the ARP table update.

Then the router looks at the destination MAC address field of the frame. If it sees its own ID inside the MAC address, this router is a second router otherwise, it is a transit router.

In the present example, the destination MAC address is:

| Router ID | VRF | | IP Address | | |
| --- | --- | --- | --- | --- | --- |
| 11 | 0 | 30 | 0 | 0 | 1 |

The Router ID inside the destination MAC address is 11, the same as router R-B's ID. Therefore, this router is a "second router".

j) As the next step when the frame is an ARP request, and the router is a second router, the router needs to replace the destination MAC address field of the frame with standard broadcast entry: "FF"

In the present example, this is the modified frame before the forwarding process:

| Layer 2 address | | ARP (request) | | | |
| --- | --- | --- | --- | --- | --- |
| Destination MAC address | Source MAC address | Sender MAC address | Sender IP address | Target MAC address | Target IP address |
| "FF" | 10-15-30-0-0-2 | 10-15-30-0-0-2 | 30.0.0.2 | 00 | 30.0.0.3 |

Then the second router forwards the frame on all its access ports which are in the same VRF as the VRF number field inside the source MAC address field of the frame.

A process of the second router setting the broadcast entry for the destination MAC address field of the arrived ARP request frame and forwarding it out on the selected access ports may be referred to as "MIPR ARP Request End Forwarding".

Thus, the router forwards this frame on access ports 6 and 5, which are in VRF 15, the same VRF as the VRF number field inside the source MAC address field of the frame.

k) Of all nodes that receive this broadcast frame, the second node Node-D 'sees' its IP address as the destination IP address and accepts that ARP request frame.

Example A2 of Example Scenario 1: An ARP Reply Frame

The process for sending an ARP reply frame from a node to respond to the ARP request frame is very similar to the transferring of an ARP request frame as described above. A main difference is that as an ARP reply frame is a kind of unicast frame, and the router does not need to send different copies of the ARP reply to different routers. Instead, the router forwards the ARP reply frame to a specific router.

In the following an example of the transferring of an ARP reply frame generated by Node-D will be described, which ARP reply frame is a response to the ARP request frame sent by Node-A.

a) The second node, Node-D, generates and sends out an ARP reply frame to the first node Node-A.

The ARP reply frame generated by Node-D may be configured according to the following:

| Layer 2 address | | ARP (reply) | | | |
| --- | --- | --- | --- | --- | --- |
| Destination MAC address | Source MAC address | Sender MAC address | Sender IP address | Target MAC address | Target IP address |
| 10-15-30-0-0-2 | D-0-0-0-0-3 | D-0-0-0-0-3 | 30.0.0.3 | 10-15-30-0-0-2 | 30.0.0.2 |

With regard to the ARP reply frame above, the destination and target MAC address field in the ARP reply frame comes from the MIPR MAC inside the source and sender MAC address field of the received ARP request. The source MAC address is the real MAC address of the Node-D.

b) The first directly connected router, R-B, receives this ARP reply frame.

This is a "second router" because the ARP reply frame arrives from an access port. Because of these two reasons: (1) The second router may look at the whole part of the frame. (2) The second router may update its ARP table by adding the frame's source IP and source MAC address entries, plus the port and VRF number of the ingress port.

| Router R-B's ARP table: | | | |
| --- | --- | --- | --- |
| IP address | Source MAC | VRF | Port |
| 30.0.0.3 | D-0-0-0-0-3 | 15 | 6 | c) The second router replaces the ARP Reply frame's source and sender MAC address field with a MIPR MAC following the "MIPR MAC Replacement" procedure.

I. Router ID (e.g., 1 byte): 11
II. VRF number (e.g., 1 byte): 15
III. Source IP address of the frame (e.g., 4 bytes): 30.0.0.3

This is the original Source MAC address field of the frame:

| $1^{st}$ byte | $2^{nd}$ byte | $3^{rd}$ byte | $4^{th}$ byte | 5th byte | $6^{th}$ byte |
| --- | --- | --- | --- | --- | --- |
| D | 0 | 0 | 0 | 0 | 3 |

This is the new MIPR MAC:

| Router ID | VRF | | IP Address | | |
| --- | --- | --- | --- | --- | --- |
| 11 | 15 | 30 | 0 | 0 | 3 |

ARP reply frame as modified by router R-B:

| Layer 2 address | | ARP (Reply) | | | |
| --- | --- | --- | --- | --- | --- |
| Destination MAC address | Source MAC address | Sender MAC address | Sender IP address | Target MAC address | Target IP address |
| 10-15-30-0-0-2 | 11-15-30-0-0-3 | 11-15-30-0-0-3 | 30.0.0.3 | 10-15-30-0-0-2 | 30.0.0.2 |

The router R-B follows the "MIPR Next Router Forwarding" procedure to send out the frame.

The router R-B fetches the Router ID from the destination MAC address field of the ARP Reply arrived frame. It is 10:

| Destination MAC address |
| --- |
| 10-15-30-0-0-2 |

Then the router R-B looks up this ID in its routing table to find the best path gateway port mapped to it. In the present example, it is port 1.

| Router R-B's Routing table: | | | | |
| --- | --- | --- | --- | --- |
| Best path | Router ID | Gateway Port | VRF for Gateway port | Hosted Subnets |
| * | 10 | 1 | 0 | 30.0.0.0/24 |
| | 10 | 2 | 0 | 30.0.0.0/24 | d) The next router, router R-C, receives the frame. Because this frame arrives from an arch port, the router follows the "MIPR Arch Receiving" procedure.

Based on the VRF number and the router ID inside the destination MAC address field, the frame can be determined to be a non-routing protocol update frame, and the router can be determined to be a transit router. There may be no ARP table updating. This transit router needs only to follow the "MIPR Next Router Forwarding" procedure to send out the frame through a proper gateway port towards the first router.

The router ID inside the destination MAC address field of the frame is 10. Based on the router R-C's routing table, the gateway port to reach the router with this ID is port 1.

| Router R-C's Routing table: | | | | |
| --- | --- | --- | --- | --- |
| Best path | Router ID | Gateway Port | VRF for Gateway port | Hosted Subnets |
| * | 10 | 1 | 0 | 30.0.0.0/24 |
| * | 11 | 2 | 0 | 30.0.0.0/24 |
| | | | | 40.0.0.0/24 |

Thus, router R-C sends out the frame on port 1.

e) The next router, router R-A, receives the frame. Because this frame arrives from an arch port, the router follows the "MIPR Arch Receiving" procedure. It shows frame is a non-routing protocol update frame, and that this router is the "first router". There may be no ARP table updating.

f) Because the frame is an ARP reply, the first router, router R-A, may replace the MIPR MAC entries inside the destination and Target MAC address field of the frame with the original MAC address of the first node.

In order to do so, the router R-A fetches the IP address from the MIPR MAC entry inside the destination MAC address field of the frame. In the present example, it is 30.0.0.2.

| Destination MAC address |
| --- |
| 10-15-30-0-0-2 |

Then the router R-A looks up this IP address in its ARP table to see what MAC address and port are mapped to this IP address.

| Router R-A's ARP table: | | | |
| --- | --- | --- | --- |
| IP address | Source MAC | VRF | Port |
| 30.0.0.2 | A-0-0-0-0-2 | 15 | 3 |

Thus, the MAC address is A-0-0-0-0-2 and the port is 3.

Now the router R-A has the original MAC address of the first node Node-A and also the port that connected to this MAC address.

As the next step, the router R-A may reverse the MIPR MAC entry inside the destination and Target MAC address field of the arrived frame with the original one.

Arrived unicast frame (ARP reply):

| Arrived unicast frame (ARP reply): | | | | | |
| --- | --- | --- | --- | --- | --- |
| Layer 2 address | | ARP (reply) | | | |
| Destination MAC address | Source MAC address | Sender MAC address | Sender IP address | Target MAC address | Target IP address |
| 10-15-30-0-0-2 | 11-15-30-0-0-3 | 11-15-30-0-0-3 | 30.0.0.3 | 10-15-30-0-0-2 | 30.0.0.2 |

After applying the MIPR Reversing procedure:

| Layer 2 address | | ARP (reply) | | | |
|---|---|---|---|---|---|
| Destination MAC address | Source MAC address | Sender MAC address | Sender IP address | Target MAC address | Target IP address |
| A-0-0-0-0-2 | 11-15-30-0-0-3 | 11-15-30-0-0-3 | 30.0.0.3 | A-0-0-0-0-2 | 30.0.0.2 |

The router R-A may then send out the frame on port 3.

This procedure of reversing the MIPR MAC field of the frame with the original MAC address of the first node and sending out the frame on the proper port may be referred to as: "MIPR MAC Reversing".

g) The node Node-A receives this frame and accepts it, as it 'sees' its own MAC address inside the destination MAC address field of the frame.

Example A3 of Example Scenario 1: A Unicast Frame

Once the node Node-A 'knows' the MAC address of the node Node-D, the node Node-A may want to send a data frame to node Node-D. This data frame may be a unicast frame with the source MAC address of node Node-A and the destination MAC address of node Node-D.

The process of transferring a unicast frame from a first node to a second node is substantially the same as transferring an ARP reply frame. The only differences may be:

(1) When a frame is unicast, in addition to the transit router(s), the first router and the second router may also 'look' only at the L2 part of the frame.

(2) Because a standard unicast data frame does not have the sender MAC address fields, the router may only need to replace the source MAC address field of the frame with a MIPR MAC.

(3) Because a standard unicast data frame does not have the target MAC address fields, the router may only need to replace the MIPR MAC inside the destination MAC address field of the frame with the original MAC address of the node.

A unicast frame that is sent out by the node Node-A may be configured in accordance with the following:

| Layer 2 address | | Layer 3 address | | |
|---|---|---|---|---|
| Destination MAC address | Source MAC address | Source IP address | Destination IP address | Payload |
| 11-15-30-0-0-3 | A-0-0-0-0-2 | 30.0.0.2 | 30.0.0.3 | | a) The directly connected router, router R-A, receives this frame. Because this is a unicast frame, and it is not an ARP reply, the router R-A only needs to 'look' a the L2 part of the frame. The router R-A needs to replace only the source MAC address field of the frame with a MIPR MAC.

| Unicast frame modified by router R-A: | | | | |
|---|---|---|---|---|
| Layer 2 address | | Layer 3 address | | |
| Destination MAC address | Source MAC address | Source IP address | Destination IP address | Payload |
| 11-15-30-0-0-3 | 10-15-30-0-0-2 | 30.0.0.2 | 30.0.0.3 | | b) As the next step, the router R-A follows the "MIPR Next Router Forwarding" procedure and sends out the frame on port 1.

c) The router R-C receives this frame. Because the frame arrives from an arch port and the router ID inside the destination MAC address is not the same as the router R-C's ID, the router R-C sends the frame to the second router with ID 11, which is the ID inside the destination MAC address field. The router R-C is doing this based on the gateway port mapped to this ID in its routing table. The router R-C sends out the frame on port 2.

d) The next router receives the frame. Because the frame arrives from an arch port and the router ID inside the destination MAC address field of the arrived frame is the same as the router R-B's ID, the router R-B is a "second router".

| Destination MAC address |
|---|
| 11-15-30-0-0-3 |

And because the frame is a standard unicast frame, the router R-B only needs to 'look' at the L2 part of the frame and then replace only the MIPR MAC inside the destination MAC address field of the frame with the original MAC address of the second node. This process is the same as "MIPR MAC Reversing". Here the router R-B needs to replace only the destination MAC address as there is no target MAC address field in a unicast data frame.

| Router R-B's ARP table: | | | |
|---|---|---|---|
| IP address | Source MAC | VRF | Port |
| 30.0.0.3 | D-0-0-0-0-3 | 15 | 6 |

| Arrived Unicast frame at router R-B: | | | | |
|---|---|---|---|---|
| Layer 2 address | | Layer 3 address | | |
| Destination MAC address | Source MAC address | Source IP address | Destination IP address | Payload |
| 11-15-30-0-0-3 | 10-15-30-0-0-2 | 30.0.0.2 | 30.0.0.3 | |

| Unicast frame modified by router R-B: | | | | |
|---|---|---|---|---|
| Layer 2 address | | Layer 3 address | | |
| Destination MAC address | Source MAC address | Source IP address | Destination IP address | Payload |
| D-0-0-0-0-3 | 10-15-30-0-0-2 | 30.0.0.2 | 30.0.0.3 | |

The router R-B sends out the frame to the second node, Node-D, on port 6, which is mapped on its ARP table to the destination IP address field of the frame e) The Node-D receives this frame, as it 'sees' its own MAC address inside the destination MAC address field of the frame.

As mentioned, one or more embodiments of the present invention are directed to facilitating conveying of at least one data frame from a first node to a second node via at least some of the plurality of routers. In the example scenario 1 described in the foregoing, the first node and the second node are in the same subnet and the same VRF and want to communicate with each other. In the following, an example scenario in which the first node and the second node are in different subnets will be described.

Example Scenario 2: The First Node and the Second Node are in Different Subnets In the following, the "second node" will be referred to as the "third node", to distinguish from the above-described example scenario 1 wherein the nodes between which at least one data frame is to be communicated are in the same subnet and which in the above-described example scenario 1 were exemplified by Node-A, i.e., node 102, and Node-D, i.e., node 302.

In the example scenario 2 described in the following, the first node and the third node are in different subnets and want to communicate with each other. With reference to FIG. 1, the first node and the third node may in the present example scenario for example be Node-A, 102, and Node-C, 301, respectively. It may be assumed that a routing protocol has already been implemented on the topology, and that the routers' routing tables are updated.

Example B1 of Example Scenario 2: An ARP Request Frame

As mentioned, the first node, Node-A, wants to communicate with the third node, Node-C. Following standard procedure, because the first node and the third node are not in the same subnet, the node Node-A does not need the MAC address of the node Node-C to generate a unicast data frame. Instead, the node Node-A may need the MAC address of its default gateway. When the node Node-A has the MAC address of its default gateway, it may generate a unicast data frame in accordance with the following and send the frame toward its default gateway:

| Layer 2 address | | Layer 3 address | | |
|---|---|---|---|---|
| Destination MAC address | Source MAC address | Source IP address | Destination IP address | Payload |
| MAC address of default gateway | A-0-0-0-0-2 | 30.0.0.1 | 40.0.0.2 | |

As can be seen, the node Node-A has the entry for all fields except the MAC address of its default gateway.

According to the illustrated example, the default gateway of Node-A is 30.0.0.1. Therefore, the node Node-A first needs to get the MAC address mapped to this default gateway IP and then generate the data frame. In order to do so:

a) The node Node-A needs to send an ARP request frame to find out the MAC address of the router that hosts the IP address 30.0.0.1, which may be configured in accordance with the following:

| Layer 2 address | | ARP (request) | | | |
|---|---|---|---|---|---|
| Destination MAC address | Source MAC address | Sender MAC address | Sender IP address | Target MAC address | Target IP address |
| "FF" | A-0-0-0-0-2 | A-0-0-0-0-2 | 30.0.0.2 | 00 | 30.0.0.1 | b) The first directly connected router, R-A, receives this ARP request frame. This is the "first router" because the frame arrives from an access port. And it is an ARP request. Because of these two reasons: (1) the first router looks at the whole part of the frame, and (2) the first router updates its ARP table by adding the source MAC and source IP address and also the port and VRF number of the ingress port.

| The router R-A's ARP table: | | | |
|---|---|---|---|
| IP address | Source MAC | VRF | Port |
| 30.0.0.2 | A-0-0-0-0-2 | 15 | 3 | c) Because router R-A 'sees' its IP address as the target IP address inside the ARP request frame, and the frame also arrives from an access port, the router R-A sends an ARP reply to the requester, Node-A, which may be configured in accordance with the following:

| Layer 2 address | | ARP (reply) | | | |
|---|---|---|---|---|---|
| Destination MAC address | Source MAC address | Sender MAC address | Sender IP address | Target MAC address | Target IP address |
| A-0-0-0-0-2 | 10-0-30-0-0-1 | 10-0-30-0-0-1 | 30.0.0.1 | A-0-0-0-0-2 | 30.0.0.2 | d) Now the first node has the MAC address of its default gateway.

| Source MAC address |
|---|
| 10-0-30-0-0-1 |

As the next step, the node Node-A sends a unicast data frame to the third node through the first router R-A.

| Layer 2 address | | Layer 3 address | | |
|---|---|---|---|---|
| Destination MAC address | Source MAC address | Source IP address | Destination IP address | Payload |
| 10-0-30-0-0-1 | A-0-0-0-0-2 | 30.0.0.1 | 40.0.0.2 | |

As can be seen, when the first node and the third node are in a different subnet, the destination MAC address field of the frame is the MAC address of the first node's default gateway IP address.

e) The router R-A receives this data frame from an access port. Thus, the router R-A is the "first router". The router R-A 'sees' one of its default gateways' MAC address as the destination MAC address field of the frame. But because the destination IP address is not one of the router's IP addresses and the source and destination IP addressed are in different subnets, the router R-A knows that this frame should be forwarded towards a third node. However, the router R-A also needs to know the MAC address of the third node to send out the frame toward it. Therefore, the router R-A may also need to send an ARP request frame to find out the MAC address of the third node.

f) The process of sending the ARP request by a router (e.g., router R-A) may be according to a standard process. The router puts the MAC address of the related default gateway IP address in the source and sender MAC address fields of the ARP request.

| Layer 2 address | | ARP (request) | | | |
|---|---|---|---|---|---|
| Destination MAC address | Source MAC address | Sender MAC address | Sender IP address | Target MAC address | Target IP address |
| "FF" | 10-0-40-0-0-1 | 10-0-40-0-0-1 | 40.0.0.1 | "00" | 40.0.0.2 | g) Then router R-A carries out the "MIPR ARP request Modification" procedure to generate different copies of the frame to any target router that hosts the subnet that matches the target IP address of the ARP request. In the illustrated example, the target IP address is 40.0.0.2. Based on the router R-A's routing table, only a router with ID 11 (router R-B) hosts subnet 40.0.0.0. Therefore, the router R-A may send only one copy of the ARP request to router R-B.

| Layer 2 address | | ARP (request) | | | |
|---|---|---|---|---|---|
| Destination MAC address | Source MAC address | Sender MAC address | Sender IP address | Target MAC address | Target IP address |
| 11-0-40-0-0-1 | 10-0-40-0-0-1 | 10-0-40-0-0-1 | 40.0.0.1 | "00" | 40.0.0.2 |

Based on the router R-A's routing table, the best path to reach router R-B is through gateway port 1. Thus, the router R-A sends out the frame on port 1 following "MIPR Next Router forwarding" procedure.

h) The next router, router R-C, receives this ARP request frame. The procedure here is the same as the procedure as described above at step g) of the example A1 of example scenario 1. Because the frame arrives from an arch port, router R-C runs the "MIPR Arch Receiving" procedure to identify whether the frame is a non-routing protocol update frame or a standard data frame, and if the router is a destination router or a transit router. In the present example, the frame is a non-routing protocol update frame, and the router is a transit router.

Then the router R-C looks up the Router ID inside the destination MAC address field of the frame in its routing table to see where to forward the frame. The routing table shows the gateway port to reach the router with ID 11 (router R-B) is port 2. The router R-C sends the frame out through port 2, following the "MIPR Next Router forwarding" procedure.

The next router, R-B, receives the frame. This step's process is the same as the procedure as described above at step i) of the example A1 of example scenario 1. Because this frame arrives from an arch port, router R-B considers the "MIPR Arch Receiving" conditions. Thus, the frame is not a routing protocol frame, and there is no need to update the ARP table update. Then the router 'looks' at the destination MAC address field of the frame. It sees its own ID inside the MAC address, so this router is a "second router".

In the illustrated example, the destination MAC address is:

| Router ID | VRF | | IP Address | | |
|---|---|---|---|---|---|
| 11 | 0 | 40 | 0 | 0 | 1 |

The Router ID inside the destination MAC address is 11, the same as R-B's ID.

i) As the next step when the frame is an ARP request, and the router is a second router, the router follows the "MIPR ARP Request End Forwarding" process to replace the destination MAC address field of the frame with standard broadcast entry: "FF" and forward the frame on all its access ports which are in the same VRF as the VRF number field inside the source MAC address field of the frame.

In the illustrated example, this is the modified frame before the forwarding process:

| Layer 2 address | | ARP (request) | | | |
|---|---|---|---|---|---|
| Destination MAC address | Source MAC address | Sender MAC address | Sender IP address | Target MAC address | Target IP address |
| "FF" | 10-15-40-0-0-1 | 10-15-40-0-0-1 | 40.0.0.1 | 00 | 40.0.0.2 |

Then the second router forwards this frame on access ports 6 and 5, which are in VRF 15, the same VRF as the VRF number field inside the source MAC address field of the frame.

j) Between all nodes that receive this broadcast frame, a third node Node-C sees its IP address as the destination IP address and accepts that ARP request frame.

Example B2 of Example Scenario 2: An ARP Reply Frame a) The node Node-C generates and sends an ARP reply frame.

b) The second router R-B receives the frame. It may update its ARP table. It may follow the "MIPR ARP Replacement" and "MIPR next router forwarding" procedures to replace the frame's source and sender MAC address with the MIPR MAC and send the frame out on the proper gateway port toward the router having the ID inside the destination MAC address field of the frame, based on its routing table.

c) The transit router R-C receives the frame. Because this frame arrives from an arch port, the router follows the "MIPR Arch Receiving" and "MIPR Next Router Forwarding" procedures.

The above steps or operations correspond to the ones described at step d) of Example A2 of example scenario 1, until the next router, router R-A, receives the ARP reply frame.

| Layer 2 address | | ARP (reply) | | | |
|---|---|---|---|---|---|
| Destination MAC address | Source MAC address | Sender MAC address | Sender IP address | Target MAC address | Target IP address |
| 10-0-40-0-0-1 | 11-15-40-0-0-2 | 11-15-40-0-0-2 | 40.0.0.2 | 10-0-40-0-0-1 | 40.0.0.1 | d) The next router, router R-A, receives the ARP reply frame. Because this frame arrives from an arch port, the router R-A follows the "MIPR Arch Receiving" procedure. It follows that frame is a non-routing protocol update frame, and that this router is the "first router". There may be no ARP table updating.

e) As router R-A 'sees' its own MAC address as the destination MAC address field of the frame, and because the frame is an ARP Reply, router R-A 'knows' this is an ARP reply frame to in response to the ARP request frame sent by router R-A.

| Destination MAC address |
|---|
| 10-0-40-0-0-1 |

The router R-A determines or fetches the MIPR MAC inside the source or sender MAC address from the arrived frame:

| Source MAC address |
|---|
| 11-15-40-0-0-2 |

Now router R-A has the MAC address of the third node, Node-C, with IP address 40.0.0.2. This IP address was the destination IP address inside the unicast data frame that the first node, Node-A, had sent to its default gateway, router R-A. Router R-A uses it in the next step to replace with the destination MAC address field of the original unicast frame sent by the node Node-A. This part may be considered to be a standard procedure.

Example B3 of Example Scenario 2: A Unicast Frame

When the source and destination IP addresses are in different subnets, router R-A, as a routing device, may set the source MAC address of the frame with its own MAC address.

a) However, in accordance with MIPR, the router R-A may implement "MIPR MAC Replacement" to replace the frame's source MAC address field with a MIPR MAC.

This is the original data frame sent by the node Node-A:

| Layer 2 address | | Layer 3 address | | |
|---|---|---|---|---|
| Destination MAC address | Source MAC address | Source IP address | Destination IP address | Payload |
| 10-0-40-0-0-1 | A-0-0-0-0-2 | 30.0.0.2 | 40.0.0.2 | |

The gateway router, R-A, may modify the frame in accordance with the following:

| Layer 2 address | | Layer 3 address | | |
|---|---|---|---|---|
| Destination MAC address | Source MAC address | Source IP address | Destination IP address | Payload |
| 11-15-40-0-0-2 | 10-0-30-0-0-2 | 30.0.0.2 | 40.0.0.2 | |

The router R-A may then follow "MIPR next router forwarding" to send out the frame.

b) The next router, the transit router R-C, receives the frame and may then follow the "MIPR Arch Receiving" and "MIPR next router forwarding" procedures.

c) The second router, router R-B, receives the frame. The process may correspond to that described at step d) of Example A3 of example scenario 1. As router R-B 'sees' its own ID inside the destination MAC address field of the frame, router R-B 'knows' it is a "second router":

| Destination MAC address |
|---|
| 11-15-40-0-0-2 | d) Router R-B may then follow the "MIPR MAC Reversing" procedure. R-B needs to reverse the MIPR MAC inside the destination MAC address field of the frame with the original MAC address of the third node.

e) Router R-B's ARP table:

| IP address | Source MAC | VRF | Port |
|---|---|---|---|
| 40.0.0.2 | C-0-0-0-0-2 | 15 | 5 |

This is the arrived unicast frame:

| Layer 2 address | | Layer 3 address | | |
|---|---|---|---|---|
| Destination MAC address | Source MAC address | Source IP address | Destination IP address | Payload |
| 11-15-40-0-0-2 | 10-0-30-0-0-2 | 30.0.0.2 | 40.0.0.2 | |

This is the unicast frame modified by router R-B before sending it out to the third node:

| Layer 2 address | | Layer 3 address | | |
|---|---|---|---|---|
| Destination MAC address | Source MAC address | Source IP address | Destination IP address | Payload |
| C-0-0-0-0-2 | 10-0-30-0-0-2 | 30.0.0.2 | 40.0.0.2 | | e) Router R-B sends out the frame to the third node, Node-C, on port 5, which is mapped on its ARP table to the destination IP address field of the frame. The node Node-C receives the unicast frame as it 'sees' its own MAC address inside the destination MAC address field of the frame.

Figure 2:
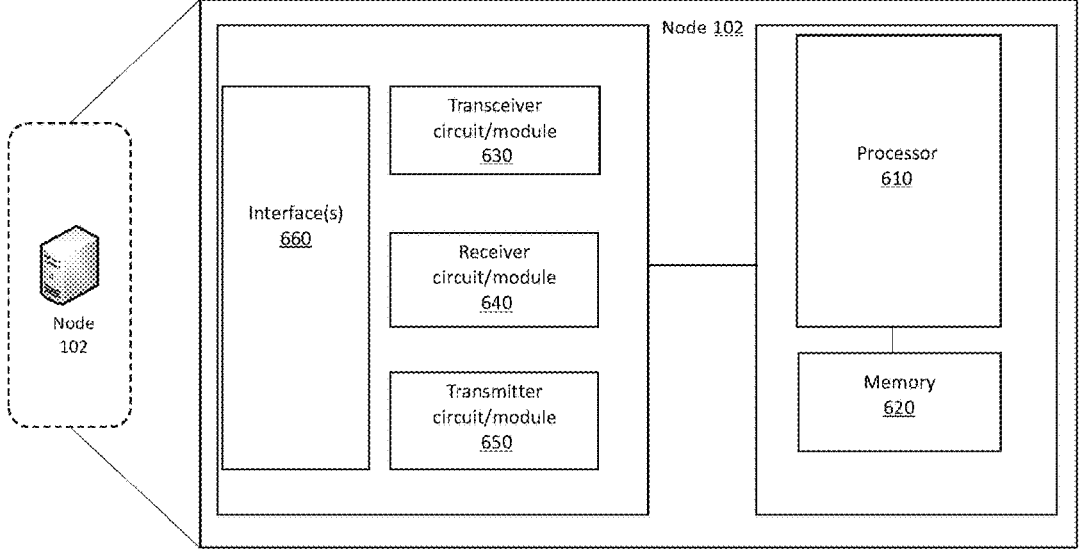
FIG. 2 is a schematic block diagram of a node in accordance with one or more embodiments of the present invention.

FIG. 2 is a schematic block diagram of a node 102 in accordance with one or more embodiments of the present invention. The node 102 illustrated in FIG. 1 may be configured in accordance with the node 2 illustrated in FIG. 2. In accordance with the embodiment of the present invention illustrated in FIG. 2, the node 102 comprises a processor 610 and possibly also a memory 620. The memory 620 may contain instructions executable by node 102 for carrying out each or any of the herein described operations of the node 102. In accordance with the embodiment of the present invention illustrated in FIG. 2, the node 102 further comprises a transmit/receive unit, or transceiver circuit or module, 630. The transmit/receive unit, or transceiver circuit or module, 630 may be configured to be capable of wired and/or wireless communications with one or more other entities, e.g., using communication techniques or means as known in the art. The processor 610 and the transmit/receive unit 630 may be configured to carry out each or any of the herein described operations of the node 102. As indicated in FIG. 2, the wired and/or wireless communications function- ality of the transmit/receive unit 630 may possibly be implemented by means of two separate components—a receiver circuit or module 640 and a transmitter circuit or module 650. The node 120 is also shown including interface(s) 660 via which wired and/or wireless communi- cations with one or more other entities—e.g., such as has been described herein for example with reference to FIG. 1—may be effectuated. It is to be understood that each or any of the nodes illustrated in FIG. 1 may be configured in accordance with the node 102 illustrated in FIG. 2.

Figure 3:
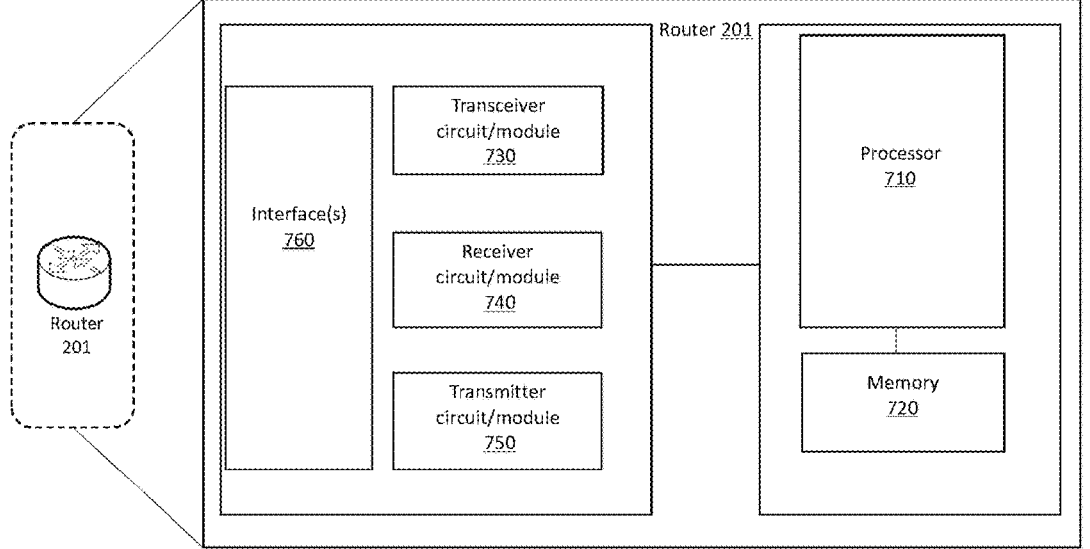
FIG. 3 is a schematic block diagram of a router in accordance with one or more embodiments of the present invention.

FIG. 3 is a schematic block diagram of a router 201 in accordance with one or more embodiments of the present invention. The router 201 illustrated in FIG. 1 may be configured in accordance with the router 201 illustrated in FIG. 3. In accordance with the embodiment of the present invention illustrated in FIG. 3, the router 201 comprises a processor 710 and possibly also a memory 720. The memory 720 may contain instructions executable by router 201 for carrying out each or any of the herein described operations of the router 201. In accordance with the embodiment of the present invention illustrated in FIG. 3, the router 201 further comprises a transmit/receive unit, or transceiver circuit or module, 730. The transmit/receive unit, or transceiver circuit or module, 730 may be configured to be capable of wired and/or wireless communications with one or more other entities, e.g., using communication techniques or means as known in the art. The processor 710 and the transmit/receive unit 730 may be configured to carry out each or any of the herein described operations of the router 201. As indicated in FIG. 3, the wired and/or wireless communications func- tionality of the transmit/receive unit 730 may possibly be implemented by means of two separate components-a receiver circuit or module 740 and a transmitter circuit or module 750. The router 201 is also shown including inter- face(s) 760 via which wired and/or wireless communications with one or more other entities—e.g., such as has been described herein for example with reference to FIG. 1—may be effectuated. It is to be understood that each or any of the routers illustrated in FIG. 1 may be configured in accordance with the router 201 illustrated in FIG. 3.

With further reference to FIGS. 2 and 3, the processor 610 and/or the processor 710 may for example include or be constituted by one or more of any suitable central processing unit (CPU), microcontroller, programmable logic controller (PLC), digital signal processor (DSP), Application Specific Integrated Circuit (ASIC), Field Programmable Gate Array (FPGA), etc., or any combination thereof. The processor 610 and/or processor 710 may optionally be capable of executing software instructions stored in a computer program product, e.g., in the form of a memory such as the memory 620 or memory 720, respectively. The memory 620 and/or memory 720 may for example be any combination of read and write memory (RAM) and read only memory (ROM). The memory 620 and/or memory 720 may comprise persistent storage, which for example can be a magnetic memory, an optical memory, a solid-state memory or a remotely mounted memory, or any combination thereof.

FIG. 4 is a schematic flowchart of a method 800 according to an embodiment of the present invention. The method 800 is in a communications network comprising a plurality of nodes including at least a first node and a second node connected via a plurality of routers including at least a first router, a second router and at least one transit router. The method 800 is for facilitating conveying of at least one data frame from the first node to the second node via at least some of the plurality of routers, wherein the first router is directly connected to the first node and the second router is directly connected to the second node, and the at least one transit router is connected between the first router and the second router. Each router has at least two interfaces configured to receive and transmit frames, and each router is configured to maintain at least one instance of a routing table indicating available routes in the communications network between the router and the plurality of nodes. Each router has a unique ID and a unique IP address, and each interface of the router has an RI identifier indicating which instance(s) of routing table is or are permitted to be used for forwarding frames via the interface. Each of the first node and the second node has an IP address and a unique MAC address, wherein each of any subnet of the communications network has a default gateway and each default gateway has an IP address, and wherein at each router, every subnet hosted by the router via any interface(s) of the router which are interfacing node(s) and the respective default gateway(s) of the subnet(s) are defined.

The method 800 comprises, at 801, the first node gener- ating a first ARP frame and sending the first ARP frame to the first router, the first ARP frame including at least: a source MAC address and a sender MAC address each of which corresponds to the MAC address of the first node, a sender IP address corresponding to the IP address of the first node, and a target IP address corresponding to the IP address of the second node.

At 802, the first router receives the first ARP frame from the first node and subsequently replaces each of the source MAC address and the sender MAC address of the first ARP frame with: the ID of the first router, the RI identifier of the interface via which the first router received the first ARP frame, and an IP address corresponding to the sender IP address of the first ARP frame.

At 803, the first router, based on the first router's routing table, determines that the second router hosts a subnet which the target IP address of the first ARP frame is part of and the ID of the second router, and subsequently sets a destination MAC address of the first ARP frame to include: the ID of the second router, the IP address of the default gateway of the said subnet, and a RI identifier indicating that any instance of routing table is permitted to be used for forwarding frames via the default gateway.

At 804, the first router determines an interface of the first router via which to forward the first ARP frame based on the first router's routing table and the ID of the second router in the destination MAC address of the first ARP frame, and forwards the first ARP frame via the determined interface.

At 805, at least one of the transit router(s) receives the first ARP frame, determines an interface of the transit router via which to forward the first ARP frame based on the transit router's routing table and the ID of the second router in the destination MAC address of the first ARP frame, and forwards the first ARP frame via the determined interface.

At 806, the second router receives the first ARP frame, and, upon determining that the second router's ID is included in the destination MAC address of the first ARP frame, sends the first ARP frame via each interface of the second router that is directly connected to a node and for which the RI identifier matches the RI identifier of the source MAC address of the first ARP frame.

At 807, the second node receives the first ARP frame, and, upon determining that the target IP address in the first ARP frame matches the IP address of the second node, determines that the first ARP frame is intended for receipt by the second node.

The method 800 may then end.

FIG. 5 is a schematic flowchart of a method 900 according to an embodiment of the present invention. The method 900 is in a communications network comprising a plurality of nodes including at least a first node and a second node connected via a plurality of routers including at least a first router, a second router and at least one transit router. The method 900 is for facilitating conveying of at least one data frame from the first node to the second node via at least some of the plurality of routers, wherein the first router is directly connected to the first node and the second router is directly connected to the second node, and the at least one transit router is connected between the first router and the second router. Each router has at least two interfaces configured to receive and transmit frames. Each router is configured to maintain at least one instance of a routing table indicating available routes in the communications network between the router and the plurality of nodes, wherein each router has a unique ID and a unique IP address, and each interface of the router has a RI identifier indicating which instance(s) of routing table is or are permitted to be used for forwarding frames via the interface. Each of the first node and the second node has an IP address and a unique MAC address. Each of any subnet of the communications network has a default gateway and each default gateway has an IP address, and wherein at each router, every subnet hosted by the router via any interface(s) of the router which are interfacing node(s) and the respective default gateway(s) of the subnet(s) are defined, wherein at each node the respective default gateway is defined. The first router is the default gateway for the first node.

The method 900 comprises, at 901, the first node generating a first ARP frame and sending the first ARP frame to the first router, the first ARP frame including at least: a source MAC address and a sender MAC address each of which corresponds to the MAC address of the first node, a sender IP address corresponding to the IP address of the first node, and a target IP address corresponding to the IP address of the default gateway at the first router.

At 902, the first router receives the first ARP frame from the first node and, upon determining that the target IP address of the first ARP frame matches the IP address of the default gateway at the first router, generates a second ARP frame and sends the second ARP frame to the first node, the second ARP frame including at least: a source MAC address and a sender MAC address each of which is set to include: the ID of the first router, the IP address of the default gateway at the first router, and the RI identifier of the interface via which the first router received the first ARP frame. The second ARP frame further includes a sender IP address corresponding to the IP address of the first router, a target IP address corresponding to the sender IP address of the first ARP frame, and a destination MAC address corresponding to the source MAC address of the first ARP frame.

At 903, the first node receives the second ARP frame from the first router and, upon determining that the target IP address of the second ARP frame matches the IP address of the first node, determines the MAC address of the first node's default gateway as the source MAC address of the second ARP frame.

At 904, the first node generates a data frame and sends the data frame to the first router, the data frame including at least: a destination MAC address corresponding to the MAC address of the first node's default gateway, a source MAC address corresponding to the MAC address of the first node, a source IP address corresponding to the IP address of the first node, and a destination IP address corresponding to the IP address of the second node.

At 905, the first router receives the data frame from the first node and, upon determining that the destination MAC address of the data frame matches the MAC address of a default gateway of the first router while the destination IP address of the data frame does not match the IP address of the first router, generates a third ARP frame including at least: a source MAC address and a sender MAC address each of which corresponds to the destination MAC address of the data frame, a sender IP address corresponding to the IP address of the first router, and a target IP address corresponding to the IP address of the second node.

At 906, the first router, based on its routing table, determines that the second router hosts a subnet which the target IP address of the third ARP frame is part of and the ID of the second router, and subsequently sets a destination MAC address of the third ARP frame to include: the ID of the second router, the IP address of the default gateway of the said subnet, and a RI identifier indicating that any instance of routing table is permitted to be used for forwarding frames via the default gateway.

At 907, the first router determines an interface of the first router via which to forward the third ARP frame based on the first router's routing table and the ID of the second router in the destination MAC address of the third ARP frame, and forwards the third ARP frame via the determined interface.

At 908, at least one of the transit router(s) receives the third ARP frame, determines an interface of the transit router via which to forward the third ARP frame based on the transit router's routing table and the ID of the second router in the destination MAC address of the third ARP frame, and forwards the third ARP frame via the determined interface.

At 909, the second router receives the third ARP frame, and, upon determining that the second router's ID is included in the destination MAC address of the third ARP frame, sends the third ARP frame via each interface of the second router that is directly connected to a node and for which the RI identifier matches the RI identifier of the source MAC address of the third ARP frame.

At 910, the second node receives the third ARP frame, and, upon determining that the target IP address in the third ARP frame matches the IP address of the second node, determines that the third ARP frame is intended for receipt by the second node.

The method 900 may then end.

In conclusion, one or more embodiments of the present invention provide one or more methods in a network topology comprising a plurality of routers and a plurality of nodes, where the routers include at least a first router, a second router and at least one transit router, wherein the method(s) permit for at least one, or some or each, of the router(s) (e.g., the transit router(s)) to determine to which entity in the network(s) to forward the data frame based on (e.g., only) the so-called layer-two part of the frame, possibly without the need to read the so-called layer three part of the data frame.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims.

For example, although specific terms may be employed herein, they are used in an illustrative and non-limiting sense only for purposes of describing one or more embodiments of the present invention. It is to be understood that embodiments of the present invention as described herein may be applicable in any wired or wireless communications systems, including wired or wireless communications systems based on 2G, 3G, 4G, 5G, WiFi, WiMax, etc.

Also, it is to be understood that while embodiments of the present invention may make reference to a particular number of nodes and a particular number of routers, it is to be understood that the referenced number of nodes and/or the referenced number of routers are exemplifying and not limiting, and that embodiments of the present invention encompass, in principle, any number of nodes and/or routers.

In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method in a communications network comprising a plurality of nodes including at least a first node and a second node connected via a plurality of routers including at least a first router, a second router and at least one transit router, the method being for facilitating conveying of at least one data frame from the first node to the second node via at least some of the plurality of routers, wherein the first router is directly connected to the first node and the second router is directly connected to the second node, and the at least one transit router is connected between the first router and the second router, wherein each router has at least two interfaces configured to receive and transmit frames, and each router is configured to maintain at least one instance of a routing table indicating available routes in the communications network between the router and the plurality of nodes, wherein each router has a unique identifier, ID, and a unique Internet Protocol (IP) address, and each interface of the router has a routing instance (RI) identifier indicating which instance(s) of routing table is or are permitted to be used for forwarding frames via the interface, and wherein each of the first node and the second node has an IP address and a unique Medium Access Control (MAC) address, wherein each of any subnet of the communications network has a default gateway and each default gateway has an IP address, and wherein at each router, every subnet hosted by the router via any interface(s) of the router which are interfacing node(s) and the respective default gateway(s) of the subnet(s) are defined, the method comprising:

the first node generating a first address resolution protocol (ARP) frame and sending the first ARP frame to the first router, the first ARP frame including at least: a source MAC address and a sender MAC address each of which corresponds to the MAC address of the first node, a sender IP address corresponding to the IP address of the first node, and a target IP address corresponding to the IP address of the second node;

the first router receiving the first ARP frame from the first node and subsequently replacing each of the source MAC address and the sender MAC address of the first ARP frame with: the ID of the first router, the RI identifier of the interface via which the first router received the first ARP frame, and an IP address corresponding to the sender IP address of the first ARP frame;

the first router, based on the first router's routing table, determining that the second router hosts a subnet which the target IP address of the first ARP frame is part of and the ID of the second router, and subsequently setting a destination MAC address of the first ARP frame to include: the ID of the second router, the IP address of the default gateway of the said subnet, and a RI identifier indicating that any instance of routing table is permitted to be used for forwarding frames via the default gateway;

the first router determining an interface of the first router via which to forward the first ARP frame based on the first router's routing table and the ID of the second router in the destination MAC address of the first ARP frame, and forwarding the first ARP frame via the determined interface;

at least one of the transit router(s) receiving the first ARP frame, determining an interface of the transit router via which to forward the first ARP frame based on the transit router's routing table and the ID of the second router in the destination MAC address of the first ARP frame, and forwarding the first ARP frame via the determined interface;

the second router receiving the first ARP frame, and, upon determining that the second router's ID is included in the destination MAC address of the first ARP frame, sending the first ARP frame via each interface of the second router that is directly connected to a node and for which the RI identifier matches the RI identifier of the source MAC address of the first ARP frame;

the second node receiving the first ARP frame, and, upon determining that the target IP address in the first ARP frame matches the IP address of the second node, determining that the first ARP frame is intended for receipt by the second node.

2. A method according to claim 1, wherein the at least one of transit router(s) receiving the first ARP frame determines the interface of the transit router via which to forward the first ARP frame only based on the transit router's routing table and the ID of the second router in the destination MAC address of the first ARP frame.

3. A method according to claim 1, wherein each router is further configured to maintain an ARP table indicating at least any identified association between IP addresses of respective ones of the plurality of routers and the plurality of nodes with their corresponding MAC addresses, wherein subsequent to the first router receiving the first ARP frame from the first node and prior to the replacing of the source MAC address and the sender MAC address of the first ARP frame, the first router updates its ARP table by associating the source MAC address of the first ARP frame with the sender IP address of the first ARP frame, and further by associating the source MAC address of the first ARP frame and the sender IP address of the first ARP frame with an indication of the interface of the first router via which the first ARP frame was received by the first router, wherein the method further comprises:

the second node generating a second ARP frame and sending the second ARP frame to the second router, the second ARP frame including at least: a source MAC address and a sender MAC address each of which corresponds to the MAC address of the second node, a sender IP address corresponding to the IP address of the second node, a target IP address corresponding to the sender IP address of the first ARP frame, and a destination MAC address and a target MAC address corresponding to the source MAC address and the sender MAC address, respectively, of the first ARP frame;

the second router receiving the second ARP frame from the second node and subsequently replacing each of the source MAC address and the sender MAC address of the second ARP frame with: the ID of the second router, the RI identifier of the interface via which the second router received the second ARP frame, and the sender IP address of the second ARP frame;

the second router determining the ID of the first router from the destination MAC address of the second ARP frame, determining an interface of the second router via which to forward the second ARP frame based on the second router's routing table and the ID of the first router, and forwarding the second ARP frame via the determined interface;

at least one of the transit router(s) receiving the second ARP frame, determining an interface of the transit router via which to forward the second ARP frame based on the transit router's routing table and the ID of the first router in the destination MAC address of the second ARP frame, and forwarding the second ARP frame via the determined interface;

the first router receiving the second ARP frame, and, upon determining that the ID of the first router is included in the destination MAC address of the second ARP frame, determining an interface of the first router via which to send the second ARP frame to the first node using the ARP table of the first router by determining the interface of the first router which is associated with the IP address in the destination MAC address of the second ARP frame in the ARP table; and the first router sending the second ARP frame to the first node using the determined interface.

4. A method according to claim 3, wherein the at least one of the transit router(s) determines an interface of the transit router via which to forward the second ARP frame only based on the transit router's routing table and the ID of the first router in the destination MAC address of the second ARP frame.

5. A method according to claim 3, wherein prior to the first router sending the second ARP frame to the first node using the determined interface, the first router determining which MAC address in the ARP table of the first router that is associated with the IP address in the destination MAC address of the second ARP frame, and subsequently replacing the destination MAC address of the second ARP frame with the determined MAC address.

6. A method according to claim 5, further comprising:

the first node receiving the second ARP frame, and, upon determining that the MAC address in the destination MAC address of the second ARP frame matches the MAC address of the first node, determining that the second ARP frame is intended for receipt by the first node.

7. A method according to claim 3, wherein subsequent to the second router receiving the second ARP frame from the second node and prior to the replacing of the source MAC address and the sender MAC address of the second ARP frame, the second router updates its ARP table by associating the source MAC address of the second ARP frame with the sender IP address of the second ARP frame, and further by associating the source MAC address of the second ARP frame and the sender IP address of the second ARP frame with an indication of the interface of the second router via which the second ARP frame was received by the second router, the method further comprising:

the first node generating a data frame and sending the data frame to the first router, the data frame including: a source MAC address corresponding to the MAC address of the first node, a destination MAC address corresponding to the source MAC address of the second ARP frame, a source IP address corresponding to the IP address of the first node, and a destination IP address corresponding to the IP address of the second node, the first router receiving the data frame from the first node and subsequently replacing the source MAC address of the data frame with: the ID of the first router, the RI identifier of the interface via which the first router received the data frame, and an IP address corresponding to the source IP address of the data frame;

the first router determining an interface of the first router via which to forward the data frame based on the first router's routing table and the ID of the second router in the destination MAC address of the data frame, and forwarding the data frame via the determined interface;

at least one of the transit router(s) receiving the data frame, determining an interface of the transit router via which to forward the data frame based on the transit router's routing table and the ID of the second router in the destination MAC address of the data frame, and forwarding the data frame via the determined interface;

the second router receiving the data frame, and, upon determining that its ID is included in the destination MAC address of the data frame, determining an interface of the second router via which to send the data ARP frame to the second node using the ARP table of the second router by determining the interface of the second router which is associated with the IP address in the destination MAC address of the data frame in the ARP table; and the second router sending the data frame to the second node using the determined interface.

8. A method according to claim 7, wherein the at least one of the transit router(s) determines an interface of the transit router via which to forward the data frame only based on the transit router's routing table and the ID of the second router in the destination MAC address of the data frame.

9. A method according to claim 7, wherein prior to the second router sending the data frame to the second node using the determined interface, the second router determining which MAC address in the ARP table of the second router that is associated with the IP address in the destination MAC address of the data frame, and subsequently replacing the destination MAC address of the data frame with the determined MAC address.

10. A method according to claim 9, further comprising:
the second node receiving the data frame, and, upon determining that the MAC address in the destination MAC address of the data frame matches the MAC address of the second node, determining that the data frame is intended for receipt by the second node.

11. A communications network comprising:
a plurality of routers, including at least a first router, a second router and at least one transit router; and
a plurality of nodes, including at least a first node and a second node connected via the plurality of routers;
wherein the first router is directly connected to the first node and the second router is directly connected to the second node, and the at least one transit router is connected between the first router and the second router, wherein each router has at least two interfaces configured to receive and transmit frames, and each router is configured to maintain at least one instance of a routing table indicating available routes in the communications network between the router and the plurality of nodes, wherein each router has a unique identifier (ID) and a unique Internet Protocol (IP) address, and each interface of the router has a routing instance (RI) identifier indicating which instance(s) of routing table is or are permitted to be used for forwarding frames via the interface, and wherein each of the first node and the second node has an IP address and a unique Medium Access Control (MAC) address, wherein each of any subnet of the communications network has a default gateway and each default gateway has an IP address, and wherein at each router, every subnet hosted by the router via any interface(s) of the router which are interfacing node(s) and the respective default gateway(s) of the subnet(s) are defined;
the first node including a processor and a transmit/receive unit configured to generate a first address resolution protocol (ARP) frame and send the first ARP frame to the first router, the first ARP frame including at least: a source MAC address and a sender MAC address each of which corresponds to the MAC address of the first node, a sender IP address corresponding to the IP address of the first node, and a target IP address corresponding to the IP address of the second node;
the first router including a processor and a transmit/receive unit configured to receive the first ARP frame from the first node and subsequently replace each of the source MAC address and the sender MAC address of the first ARP frame with: the ID of the first router, the RI identifier of the interface via which the first router received the first ARP frame, and an IP address corresponding to the sender IP address of the first ARP frame;
the processor and the transmit/receive unit of the first router being further configured to, based on the first router's routing table, determine that the second router hosts a subnet which the target IP address of the first ARP frame is part of and the ID of the second router, and subsequently set a destination MAC address of the first ARP frame to include: the ID of the second router, the IP address of the default gateway of the said subnet, and a RI identifier indicating that any instance of routing table is permitted to be used for forwarding frames via the default gateway;
the processor and the transmit/receive unit of the first router being further configured to determine an interface of the first router via which to forward the first ARP frame based on the first router's routing table and the ID of the second router in the destination MAC address of the first ARP frame, and forward the first ARP frame via the determined interface;
at least one of the transit router(s) including a processor and a transmit/receive unit configured to receive the first ARP frame, determine an interface of the transit router via which to forward the first ARP frame based on the transit router's routing table and the ID of the second router in the destination MAC address of the first ARP frame, and forward the first ARP frame via the determined interface;
the second router including a processor and a transmit/receive unit configured to receive the first ARP frame, and, upon determination that the second router's ID is included in the destination MAC address of the first ARP frame, send the first ARP frame via each interface of the second router that is directly connected to a node and for which the RI identifier matches the RI identifier of the source MAC address of the first ARP frame;
the second node including a processor and a transmit/receive unit configured to receive the first ARP frame, and, upon determination that the target IP address in the first ARP frame matches the IP address of the second node, determine that the first ARP frame is intended for receipt by the second node.

12. A method in a communications network comprising a plurality of nodes including at least a first node and a second node connected via a plurality of routers including at least a first router, a second router and at least one transit router, the method being for facilitating conveying of at least one data frame from the first node to the second node via at least some of the plurality of routers, wherein the first router is directly connected to the first node and the second router is directly connected to the second node, and the at least one transit router is connected between the first router and the second router, wherein each router has at least two interfaces configured to receive and transmit frames, and each router is configured to maintain at least one instance of a routing table indicating available routes in the communications network between the router and the plurality of nodes, wherein each router has a unique identifier (ID) and a unique Internet Protocol (IP) address, and each interface of the router has a routing instance (RI) identifier indicating which instance(s) of routing table is or are permitted to be used for forwarding frames via the interface, and wherein each of the first node and the second node has an IP address and a unique Medium Access Control, MAC, address, wherein each of any subnet of the communications network has a default gateway and each default gateway has an IP address, and wherein at each router, every subnet hosted by the router via any interface(s) of the router which are interfacing node(s) and the respective default gateway(s) of the subnet(s) are defined, wherein at each node the respective default gateway is defined, wherein the first router is the default gateway for the first node, the method comprising:
the first node generating a first address resolution protocol (ARP) frame and sending the first ARP frame to the first router, the first ARP frame including at least: a source MAC address and a sender MAC address each of which corresponds to the MAC address of the first node, a sender IP address corresponding to the IP address of the first node, and a target IP address corresponding to the IP address of the default gateway at the first router;
the first router receiving the first ARP frame from the first node and, upon determining that the target IP address of the first ARP frame matches the IP address of the default gateway at the first router, generating a second ARP frame and sending the second ARP frame to the first node, the second ARP frame including at least: a source MAC address and a sender MAC address each of which is set to include: the ID of the first router, the IP address of the default gateway at the first router, and the RI identifier of the interface via which the first router received the first ARP frame, the second ARP frame further including a sender IP address corresponding to the IP address of the first router, a target IP address corresponding to the sender IP address of the first ARP frame, and a destination MAC address corresponding to the source MAC address of the first ARP frame;

the first node receiving the second ARP frame from the first router and, upon determining that the target IP address of the second ARP frame matches the IP address of the first node, determining the MAC address of the first node's default gateway as the source MAC address of the second ARP frame;

the first node generating a data frame and sending the data frame to the first router, the data frame including at least: a destination MAC address corresponding to the MAC address of the first node's default gateway, a source MAC address corresponding to the MAC address of the first node, a source IP address corresponding to the IP address of the first node, and a destination IP address corresponding to the IP address of the second node;

the first router receiving the data frame from the first node and, upon determining that the destination MAC address of the data frame matches the MAC address of a default gateway of the first router while the destination IP address of the data frame does not match the IP address of the first router, generating a third ARP frame including at least: a source MAC address and a sender MAC address each of which corresponds to the destination MAC address of the data frame, a sender IP address corresponding to the IP address of the first router, and a target IP address corresponding to the IP address of the second node;

the first router, based on its routing table, determining that the second router hosts a subnet which the target IP address of the third ARP frame is part of and the ID of the second router, and subsequently setting a destination MAC address of the third ARP frame to include: the ID of the second router, the IP address of the default gateway of the said subnet, and a RI identifier indicating that any instance of routing table is permitted to be used for forwarding frames via the default gateway;

the first router determining an interface of the first router via which to forward the third ARP frame based on the first router's routing table and the ID of the second router in the destination MAC address of the third ARP frame, and forwarding the third ARP frame via the determined interface;

at least one of the transit router(s) receiving the third ARP frame, determining an interface of the transit router via which to forward the third ARP frame based on the transit router's routing table and the ID of the second router in the destination MAC address of the third ARP frame, and forwarding the third ARP frame via the determined interface;

the second router receiving the third ARP frame, and, upon determining that the second router's ID is included in the destination MAC address of the third ARP frame, sending the third ARP frame via each interface of the second router that is directly connected to a node and for which the RI identifier matches the RI identifier of the source MAC address of the third ARP frame;

the second node receiving the third ARP frame, and, upon determining that the target IP address in the third ARP frame matches the IP address of the second node, determining that the third ARP frame is intended for receipt by the second node.

13. A method according to claim 12, wherein the at least one of the transit router(s) receiving the third ARP frame determines the interface of the transit router via which to forward the third ARP frame only based on the transit router's routing table and the ID of the second router in the destination MAC address of the third ARP frame.

14. A method according to claim 13, wherein subsequent to the second router receiving the fourth ARP frame from the second node and prior to the replacing of the source MAC address and the sender MAC address of the fourth ARP frame, the second router updates its ARP table by associating the source MAC address of the fourth ARP frame with the sender IP address of the fourth ARP frame, and further by associating the source MAC address of the fourth ARP frame and the sender IP address of the fourth ARP frame with an indication of the interface of the second router via which the fourth ARP frame was received by the second router, the method further comprising:

the first router replacing the source MAC address of the data frame with the destination MAC address of the data frame and subsequently replacing the destination MAC address of the data frame with the source MAC address of the fourth ARP frame;

the first router determining an interface of the first router via which to forward the data frame based on the first router's routing table and the ID of the second router in the destination MAC address of the data frame, and forwarding the data frame via the determined interface;

at least one of the transit router(s) receiving the data frame, determining an interface of the transit router via which to forward the data frame based on the transit router's routing table and the ID of the second router in the destination MAC address of the data frame, and forwarding the data frame via the determined interface;

the second router receiving the data frame, and, upon determining that its ID is included in the destination MAC address of the data frame, determining an interface of the second router via which to send the data ARP frame to the second node using the ARP table of the second router by determining the interface of the second router which is associated with the IP address in the destination MAC address of the data frame in the ARP table; and the second router sending the data frame to the second node using the determined interface.

15. A method according to claim 14, wherein the at least one of the transit router(s) determines an interface of the transit router via which to forward the data frame only based on the transit router's routing table and the ID of the second router in the destination MAC address of the data frame.

16. A method according to claim 14, wherein prior to the second router sending the data frame to the second node using the determined interface, the second router determining which MAC address in the ARP table of the second router that is associated with the IP address in the destination MAC address of the data frame, and subsequently replacing the destination MAC address of the data frame with the determined MAC address.

17. A method according to claim 16, further comprising:

the second node receiving the data frame, and, upon determining that the MAC address in the destination MAC address of the data frame matches the MAC address of the second node, determining that the data frame is intended for receipt by the second node.

18. A method according to claim 12, further comprising:

the second node generating a fourth ARP frame and sending the fourth ARP frame to the second router, the fourth ARP frame including at least: a source MAC address and a sender MAC address each of which corresponds to the MAC address of the second node, a sender IP address corresponding to the IP address of the second node, a target IP address corresponding to the sender IP address of the third ARP frame, and a destination MAC address and a target MAC address corresponding to the source MAC address and the sender MAC address, respectively, of the third ARP frame;

the second router receiving the fourth ARP frame from the second node and subsequently replacing each of the source MAC address and the sender MAC address of the fourth ARP frame with: the ID of the second router, the RI identifier of the interface via which the second router received the fourth ARP frame, and the sender IP address of the fourth ARP frame;

the second router determining the ID of the first router from the destination MAC address of the fourth ARP frame, determining an interface of the second router via which to forward the second ARP frame based on the second router's routing table and the ID of the first router, and forwarding the fourth ARP frame via the determined interface;

at least one of the transit router(s) receiving the fourth ARP frame, determining an interface of the transit router via which to forward the fourth ARP frame based on the transit router's routing table and the ID of the first router in the destination MAC address of the fourth ARP frame, and forwarding the fourth ARP frame via the determined interface;

the first router receiving the fourth ARP frame, and, upon determining that the ID of the first router is included in the destination MAC address of the fourth ARP frame, determining that the fourth ARP frame is intended for receipt by the first router.

19. A communications network comprising:

a plurality of routers, including at least a first router, a second router and at least one transit router; and a plurality of nodes, including at least a first node and a second node connected via the plurality of routers;

wherein the first router is directly connected to the first node and the second router is directly connected to the second node, and the at least one transit router is connected between the first router and the second router, wherein each router has at least two interfaces configured to receive and transmit frames, and each router is configured to maintain at least one instance of a routing table indicating available routes in the communications network between the router and the plurality of nodes, wherein each router has a unique identifier (ID) and a unique Internet Protocol (IP) address, and each interface of the router has a routing instance (RI) identifier indicating which instance(s) of routing table is or are permitted to be used for forwarding frames via the interface, and wherein each of the first node and the second node has an IP address and a unique Medium Access Control (MAC) address, wherein each of any subnet of the communications network has a default gateway and each default gateway has an IP address, and wherein at each router, every subnet hosted by the router via any interface(s) of the router which are interfacing node(s) and the respective default gateway(s) of the subnet(s) are defined, wherein at each node the respective default gateway is defined, wherein the first router is the default gateway for the first node;

the first node including a processor and a transmit/receive unit configured to generate a first address resolution protocol (ARP) frame and send the first ARP frame to the first router, the first ARP frame including at least: a source MAC address and a sender MAC address each of which corresponds to the MAC address of the first node, a sender IP address corresponding to the IP address of the first node, and a target IP address corresponding to the IP address of the default gateway at the first router;

the first router including a processor and a transmit/receive unit configured to receive the first ARP frame from the first node and, upon determining that the target IP address of the first ARP frame matches the IP address of the default gateway at the first router, generate a second ARP frame and send the second ARP frame to the first node, the second ARP frame including at least: a source MAC address and a sender MAC address each of which is set to include: the ID of the first router, the IP address of the default gateway at the first router, and the RI identifier of the interface via which the first router received the first ARP frame, the second ARP frame further including a sender IP address corresponding to the IP address of the first router, a target IP address corresponding to the sender IP address of the first ARP frame, and a destination MAC address corresponding to the source MAC address of the first ARP frame;

the processor and the transmit/receive unit of the first node further being configured to receive the second ARP frame from the first router and, upon determination that the target IP address of the second ARP frame matches the IP address of the first node, determine the MAC address of the first node's default gateway as the source MAC address of the second ARP frame;

the processor and the transmit/receive unit of the first node further being configured to generate a data frame and send the data frame to the first router, the data frame including at least: a destination MAC address corresponding to the MAC address of the first node's default gateway, a source MAC address corresponding to the MAC address of the first node, a source IP address corresponding to the IP address of the first node, and a destination IP address corresponding to the IP address of the second node;

the first router receiving the data frame from the first node and, upon determining that the destination MAC address of the data frame matches the MAC address of a default gateway of the first router while the destination IP address of the data frame does not match the IP address of the first router, generating a third ARP frame including at least: a source MAC address and a sender MAC address each of which corresponds to the destination MAC address of the data frame, a sender IP address corresponding to the IP address of the first router, and a target IP address corresponding to the IP address of the second node;

the processor and the transmit/receive unit of the first router further being configured to, based on the routing table of the first router, determine that the second router hosts a subnet which the target IP address of the third ARP frame is part of and the ID of the second router, and subsequently set a destination MAC address of the third ARP frame to include: the ID of the second router, the IP address of the default gateway of the said subnet, and a RI identifier indicating that any instance of routing table is permitted to be used for forwarding frames via the default gateway;

the processor and the transmit/receive unit of the first router further being configured to determine an interface of the first router via which to forward the third ARP frame based on the first router's routing table and the ID of the second router in the destination MAC address of the third ARP frame, and forward the third ARP frame via the determined interface;

at least one of the transit router(s) including a processor and a transmit/receive unit configured to receive the third ARP frame, determine an interface of the transit router via which to forward the third ARP frame based on the transit router's routing table and the ID of the second router in the destination MAC address of the third ARP frame, and forward the third ARP frame via the determined interface;

the second router including a processor and a transmit/receive unit configured to receive the third ARP frame, and, upon determination that the second router's ID is included in the destination MAC address of the third ARP frame, send the third ARP frame via each interface of the second router that is directly connected to a node and for which the RI identifier matches the RI identifier of the source MAC address of the third ARP frame;

the second node including a processor and a transmit/receive unit configured to receive the third ARP frame, and, upon determination that the target IP address in the third ARP frame matches the IP address of the second node, determine that the third ARP frame is intended for receipt by the second node.

* * * * *